United States Patent

(12) United States Patent
Okuyama

(10) Patent No.: US 12,055,808 B2
(45) Date of Patent: Aug. 6, 2024

(54) ELECTRONIC DEVICE

(71) Applicant: Japan Display Inc., Tokyo (JP)

(72) Inventor: Kentaro Okuyama, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/188,493

(22) Filed: Mar. 23, 2023

(65) Prior Publication Data
US 2023/0305330 A1    Sep. 28, 2023

(30) Foreign Application Priority Data
Mar. 24, 2022    (JP) .................. 2022-048561

(51) Int. Cl.
| G02F 1/1333 | (2006.01) |
| G02F 1/133 | (2006.01) |
| G02F 1/1334 | (2006.01) |
| G02F 1/1335 | (2006.01) |
| G02F 1/1337 | (2006.01) |
| G02F 1/137 | (2006.01) |

(52) U.S. Cl.
CPC ...... G02F 1/13338 (2013.01); G02F 1/13306 (2013.01); G02F 1/1334 (2013.01); G02F 1/133531 (2021.01); G02F 1/1337 (2013.01); G02F 1/13725 (2013.01)

(58) Field of Classification Search
CPC ........... G02F 1/13338; G02F 1/133531; G02F 1/13306; G02F 1/1334; G02F 1/1337; G02F 1/13725

USPC .............................................. 349/1
See application file for complete search history.

(56) References Cited

U.S. PATENT DOCUMENTS

| 2005/0128332 A1* | 6/2005 | Tsuboi .................. H04N 7/144 348/333.12 |
| 2014/0347436 A1 | 11/2014 | DeMerchant et al. |
| 2018/0203179 A1* | 7/2018 | Nguyen ............... H04N 13/302 |

FOREIGN PATENT DOCUMENTS

| JP | 4411059 B2 | 2/2010 |
| JP | 2014-230282 A | 12/2014 |

* cited by examiner

*Primary Examiner* — Michael H Caley
*Assistant Examiner* — William D Peterson
(74) *Attorney, Agent, or Firm* — XSENSUS LLP

(57) ABSTRACT

According to one embodiment, an electronic device includes a display panel including a display area, a light source unit, a camera, a modulating element, and a control unit. The control unit permits light emission executed, displays an image in the display area, and switching the modulating element to the light-shielding state, in a light emission period. The control unit prohibits the light emission executed, switching the modulating element to the transmissive state, and makes the camera take in the external light transmitted through the display area and the modulating element, in a capturing period.

16 Claims, 28 Drawing Sheets

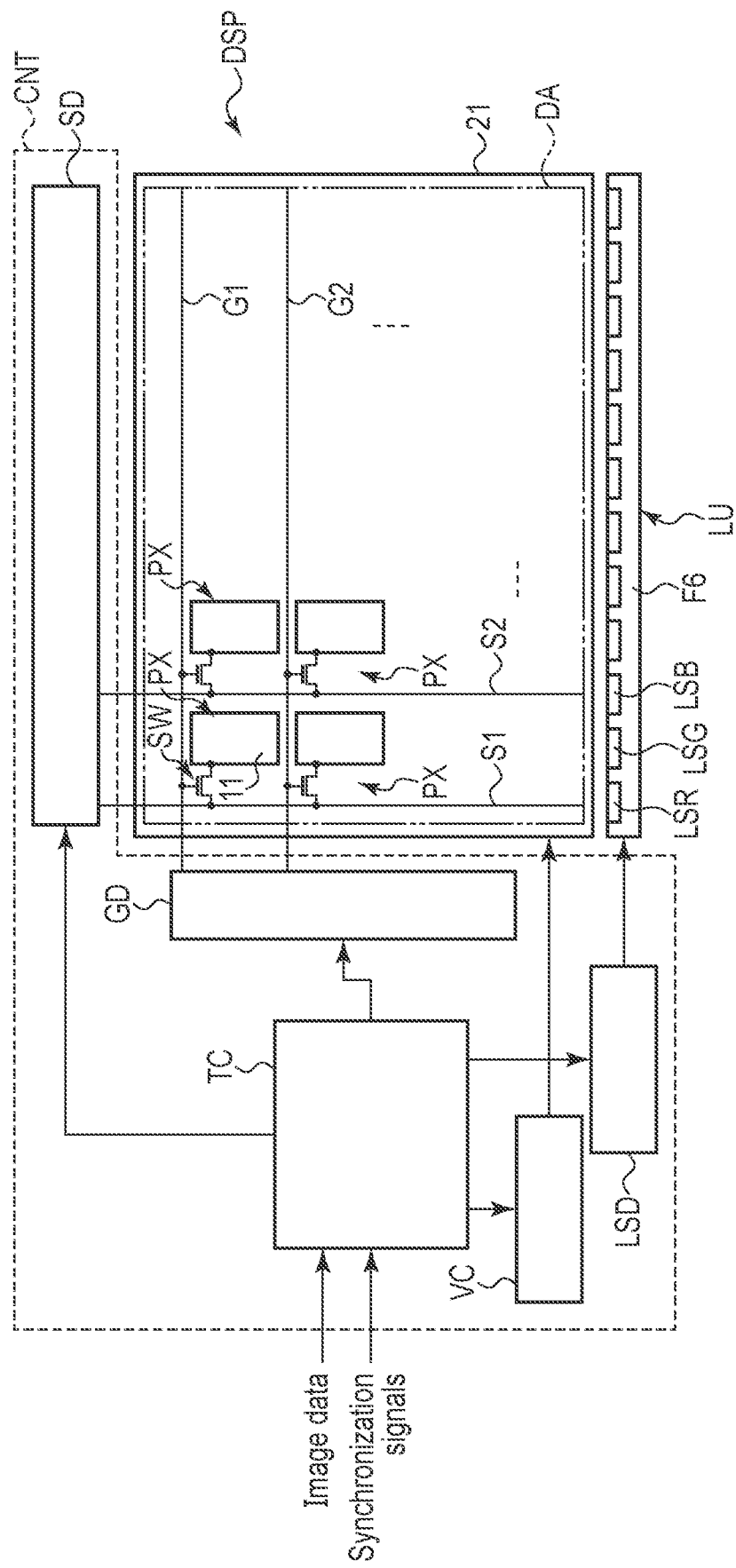
F I G. 4

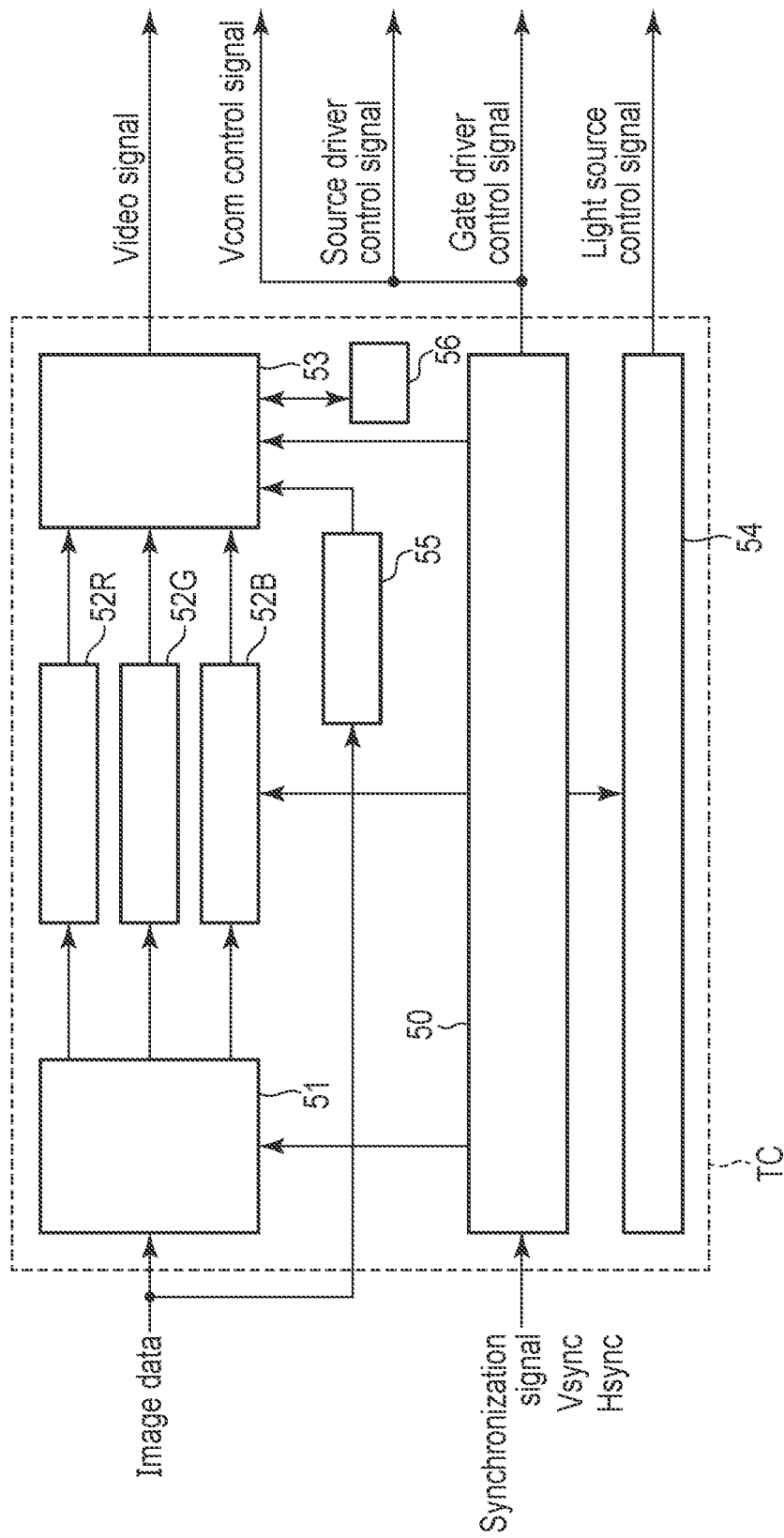
F I G. 12

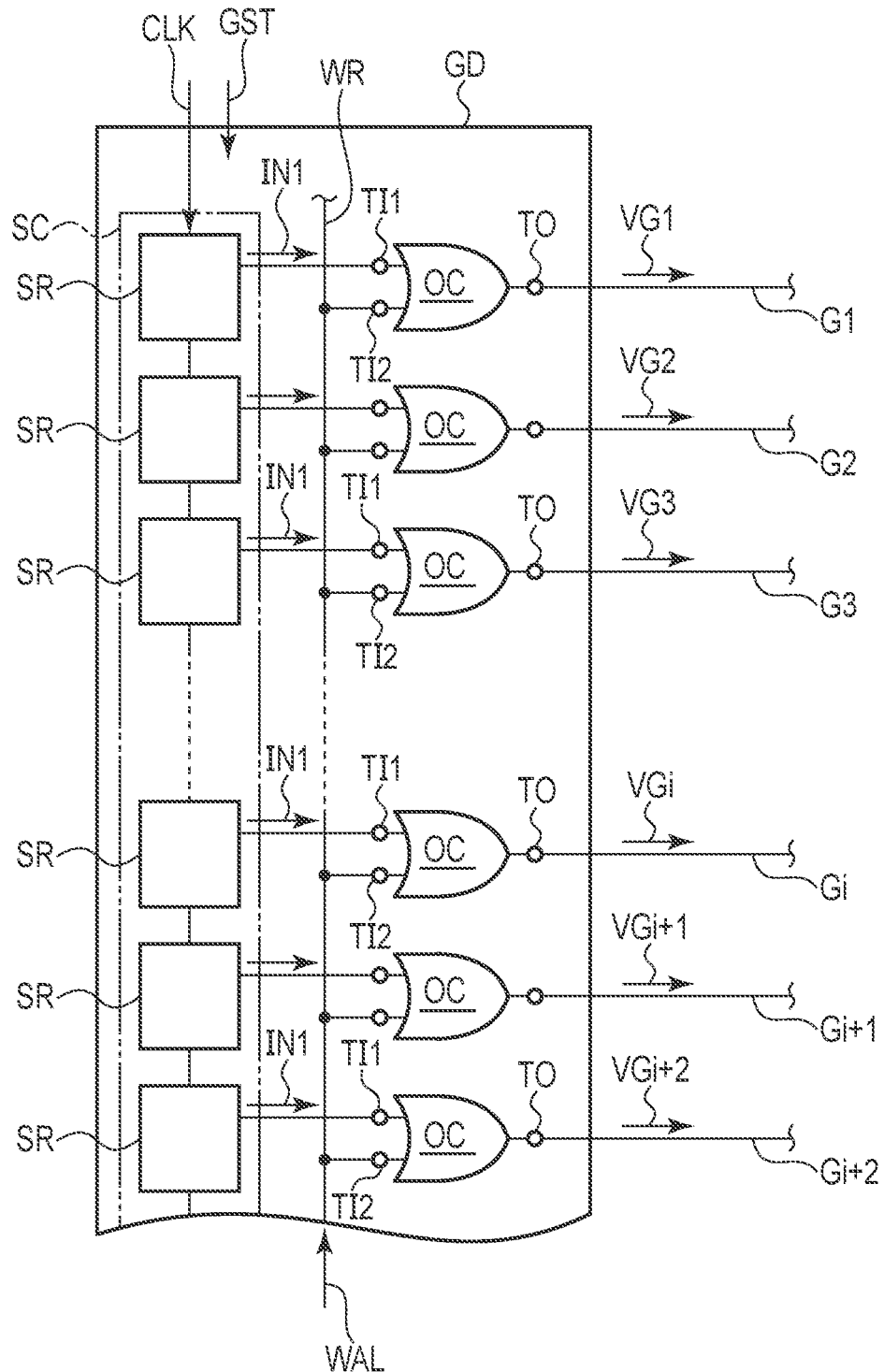
F I G. 17

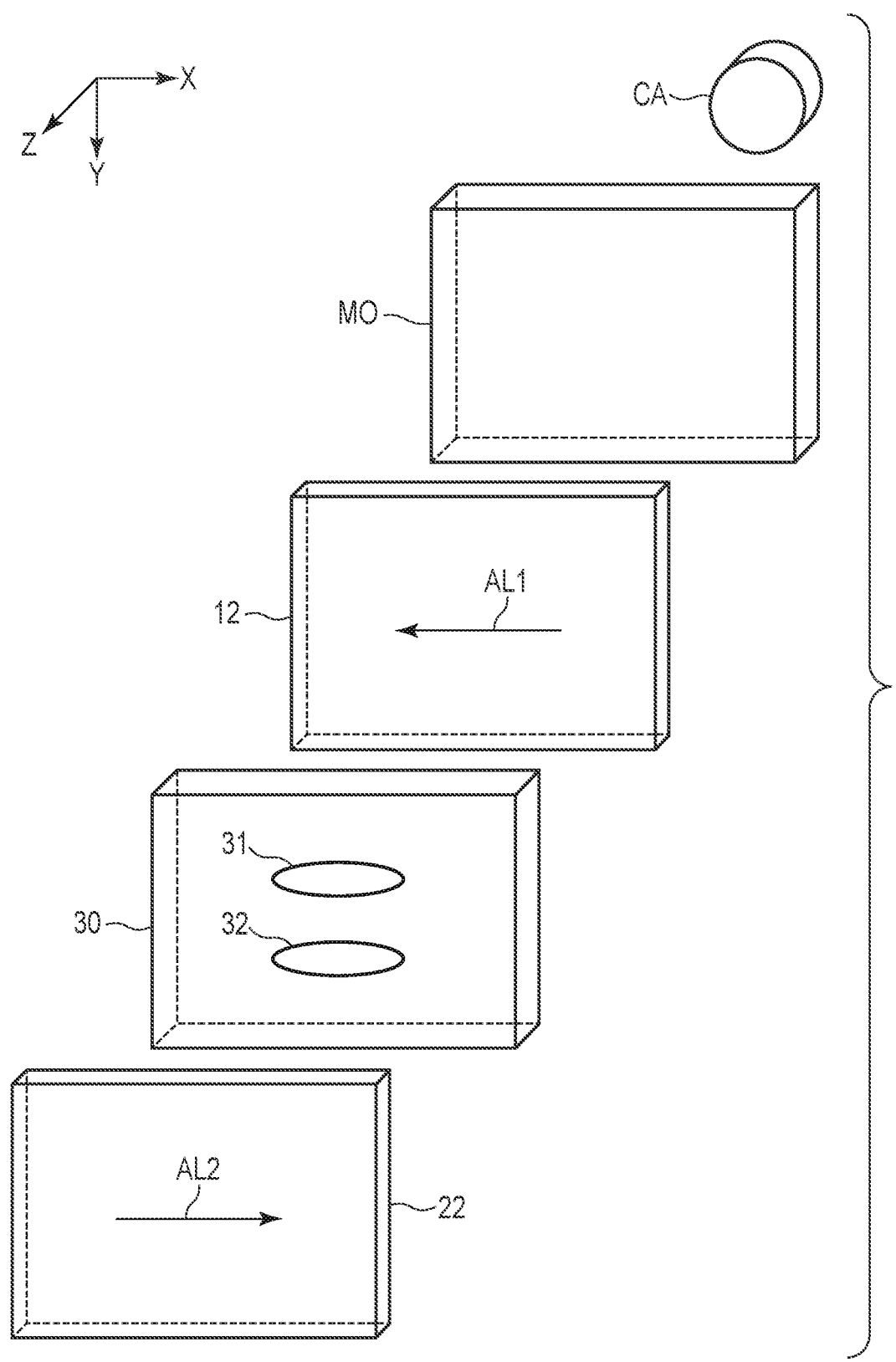
F I G. 20

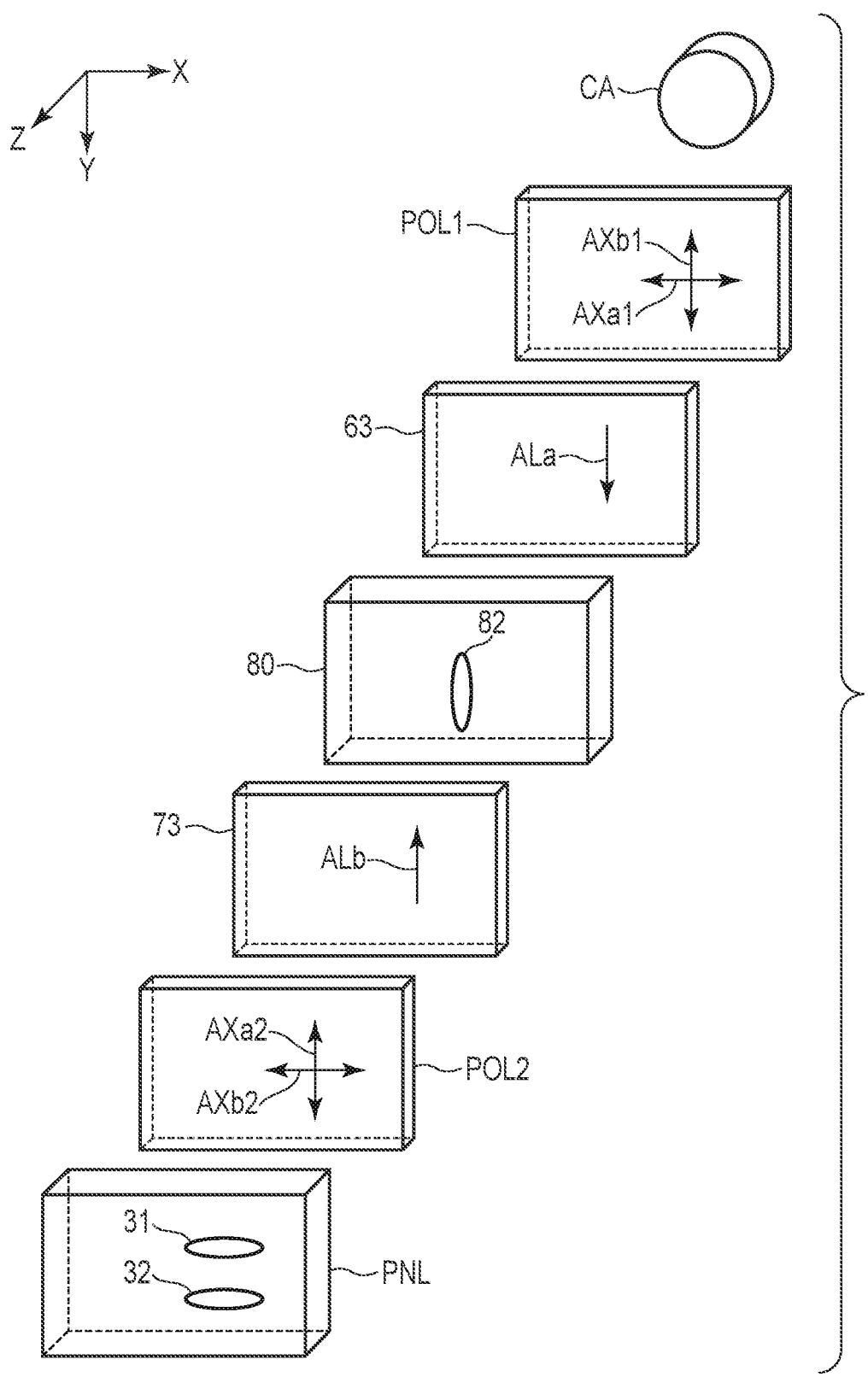
F I G. 30

ELECTRONIC DEVICE

CROSS-REFERENCE TO RELATED
APPLICATIONS

This application is based upon and claims the benefit of priority from Japanese Patent Application No. 2022-048561, filed Mar. 24, 2022, the entire contents of which are incorporated herein by reference.

FIELD

Embodiments described herein relate generally to an electronic device.

BACKGROUND

Online conferences and the like have been prevalently spread, and an online conference system in which a camera and a personal computer are combined is frequently used in situations such as business, school, and meeting. However, eye contact with a partner projected on a screen cannot be made, and degradation in communication quality is caused. This is because a camera is located outside a screen of a display panel such as a liquid crystal display panel or an organic electroluminescent (EL) display panel.

For example, when a user looks at a face of a partner projected on the screen, the user cannot face the camera. In this case, the partner cannot make eye contact with the user.

In contrast, when the user faces the camera, the partner can make eye contact with the user. However, the user cannot watch the face of the partner projected on the screen.

BRIEF DESCRIPTION OF THE DRAWINGS

FIG. 4 is a diagram showing main components of the display device shown in FIG. 2.

FIG. 12 is a diagram showing a configuration example of a timing controller shown in FIG. 4.

FIG. 17 is a circuit diagram showing a part of a gate driver and several gate lines shown in FIG. 4 and the like.

FIG. 20 is an exploded perspective view showing parts of an electronic device according to a second embodiment, illustrating a display alignment film, a display liquid crystal layer, a modulating element, and a camera.

FIG. 30 is an exploded perspective view showing parts of the electronic device according to the seventh embodiment, illustrating a display panel, a polarizing element, a control alignment film, a control liquid crystal layer, and a camera.

DETAILED DESCRIPTION

Figure 1:
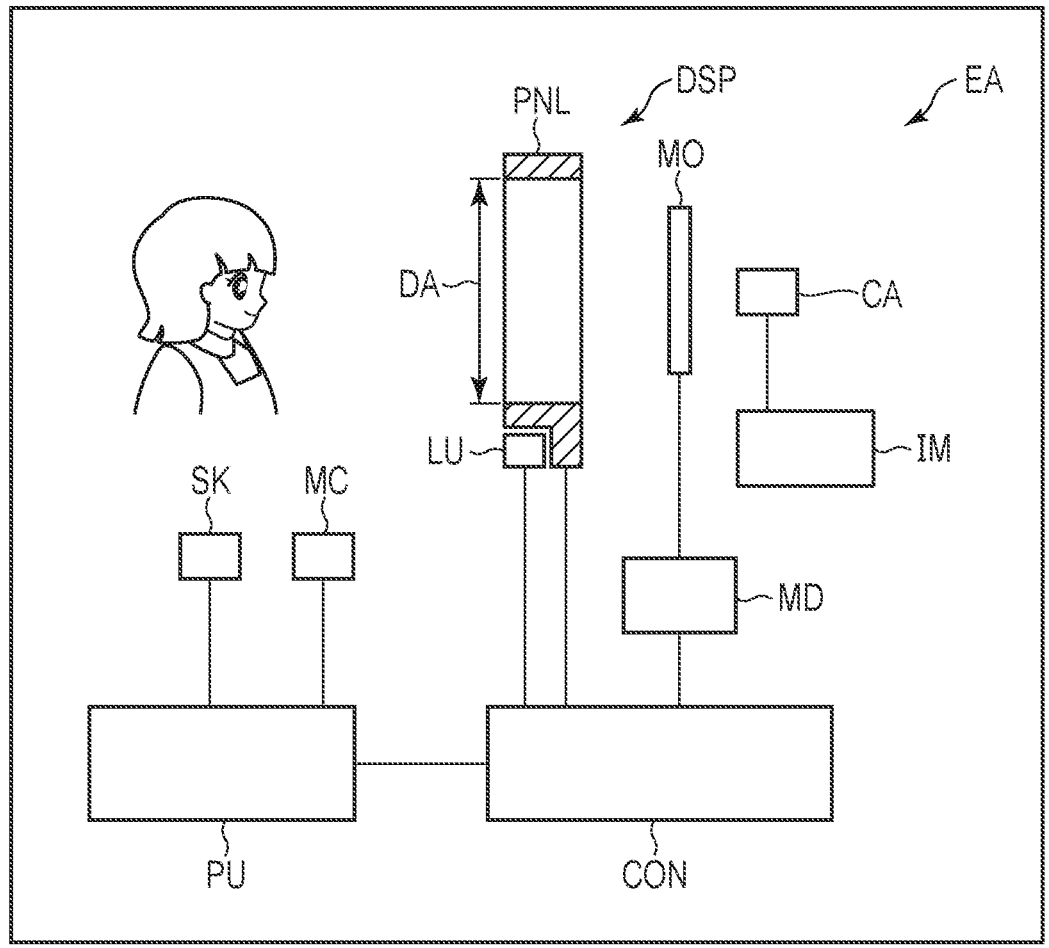
FIG. 1 is a block diagram showing an electronic device according to a first embodiment using functional blocks.

In general, according to one embodiment, there is provided an electronic device comprising: a display panel including a display area on which an image is displayed and which transmits external light; a light source unit located outside an area opposed to the display area of the display panel; a camera opposed to the display area of the display panel; a modulating element located between the display area of the display panel and the camera, and switched to a transmissive state which transmits light traveling from the display area to the camera and a light-shielding state in which the light traveling from the display area to the camera is blocked; and a control unit controlling drive of the display panel, the light source unit, and the modulating element, the control unit permitting light emission executed by the light source unit, making light emitted to the display area, displaying the image in the display area, and switching the modulating element to the light-shielding state, in a light emission period, and prohibiting the light emission executed by the light source unit, making the display area transparent, switching the modulating element to the transmissive state, and making the camera take in the external light transmitted through the display area and the modulating element, in a capturing period independent of the light emission period.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First, a basic concept of the embodiments of the present invention will be described.

In a case where a user of an electronic device comprising a display panel and a camera performs an online conference while using the camera, there is a problem that when the user watches a face of a partner projected on a screen, the user cannot make eye contact with the partner. This is because the partner is captured by a camera located outside the screen. As a method for solving such a problem, a technology of shifting the partner's line of sight by image processing and displaying an image on which the user can make eye contact with the partner's line of sight on the screen has also been developed.

However, since there are problems in latency and processing accuracy, the user feels uncomfortable with the image.

In addition, the camera can be placed in front of the screen but, since the camera overlaps with the screen, the visibility of the image displayed on the screen is hindered by the camera.

Furthermore, the camera can be provided in the vicinity of a center of the display panel such that the image may not be displayed in the vicinity of the center and the vicinity of the center may be set as an area dedicated to capturing. However, there are problems that an area in which the image can be displayed is reduced, that the user feels uncomfortable when talking to the camera, and the like.

In addition, a technique of increasing an aperture ratio by improving the layout of several pixels on an organic electroluminescent (EL) display panel such that the user can be captured through the screen of the organic EL display panel can be conceived. However, the organic EL display panel includes a pixel circuit more complicated than the liquid crystal display panel and requires a plurality of signal lines, and there is a problem that the aperture ratio of the organic EL display panel can hardly be increased to the same level as the aperture ratio of the liquid crystal display panel.

Based on the above, the technical level for achieving both the capturing of a subject (user) by the camera and the display of the image on the screen has not reached a satisfactory level.

Thus, in the embodiments of the present invention, such a problem is improved, and an electronic device capable of capturing the subject over the screen and displaying the image on the screen can be obtained.

For example, a technique of using an electronic device comprising a transparent liquid crystal display panel having a transmittance of 80% or more, a camera located behind the liquid crystal display panel as viewed from the user, and a modulating element located between the transparent liquid crystal display panel and the camera, and synchronizing the driving of the liquid crystal display panel with the driving of the modulating element, can be employed. As a result, the user can naturally direct the own line of sight toward the camera while making eye contact with the partner displayed on the screen.

As will be described later, it is necessary to pay attention to a capturing period of the camera. This is because the transparent liquid crystal display panel releases light incident from a light source unit not only to the user side but also to the camera side. The image displayed on the transparent liquid crystal display panel can be captured by the camera. Thus, the modulating element may be switched to the light-shielding state in a period in which light is made incident on the transparent liquid crystal display panel from the light source unit, and the modulating element may be switched to the transmissive state in a period in which light is not made incident on the transparent liquid crystal display panel from the light source unit. Thus, a situation in which the image displayed on the transparent liquid crystal display panel is reflected on the image captured by the camera can be avoided.

Furthermore, when degradation in image quality such as distortion occurs in the images captured by the camera due to a display state (a state of a liquid crystal layer) of the transparent liquid crystal display panel, the deterioration in the image quality can be suppressed by making a display area (display liquid crystal layer) of the transparent liquid crystal display panel into a more transparent state or sandwiching a polarizing element between the transparent liquid crystal display panel and the camera.

Next, means and methods for improving the above problem will be described.

In each of the embodiments, an electronic device in which a polymer dispersed liquid crystal is applied to a display panel will be described. The electronic device of each of the embodiments can be used for various electronic devices such as personal computers, tablet terminals, and smartphones.

First Embodiment

FIG. 1 is a block diagram showing an electronic device EA according to a first embodiment by using functional blocks. As shown in FIG. 1, the electronic device EA comprises a display panel PNL, a light source unit LU, a camera CA, an imaging circuit IM, a modulating element MO, a modulating element drive circuit MD, a control unit CON, a processing unit PU, a microphone MC, and a speaker SK.

The display panel PNL has a display area DA which displays images and transmits external light. In the drawing, hatching is applied to areas of the display panel PNL other than the display area DA. The light source unit LU is located outside an area of the display panel PNL, which is opposed to the display area DA. Each of the display panel PNL and the light source unit LU is connected to the control unit CON. The camera CA is opposed to the display area DA of the display panel PNL. The camera CA is connected to the imaging circuit IM. In the present embodiment, the camera CA is not connected to the control unit CON, but the camera CA may be connected to the control unit CON via the imaging circuit IM.

The modulating element MO is located between the display area DA of the display panel PNL and the camera CA. The modulating element MO is switched to a transmissive state of transmitting light traveling from the display area DA toward the camera CA or a light-shielding state of blocking light traveling from the display area DA toward the camera CA. The modulating element MO is connected to the control unit CON via the modulating element drive circuit MD. The camera CA can capture a subject (user) through the display panel PNL and the modulating element MO.

The control unit CON can control driving of the display panel PNL, the light source unit LU, and the modulating element MO. The control unit CON can synchronize driving of the display panel PNL, the light source unit LU, and the modulating element MO with each other. The control unit CON may control driving of the camera CA as needed. In this case, the control unit CON can synchronize the driving of the display panel PNL, the light source unit LU, the modulating element MO, and the camera CA with each other. The control unit CON, the display panel PNL, and the light source unit LU constitute a display device DSP. Each of the control unit CON, the microphone MC, and the speaker SK is connected to the processing unit PU.

Figure 2:
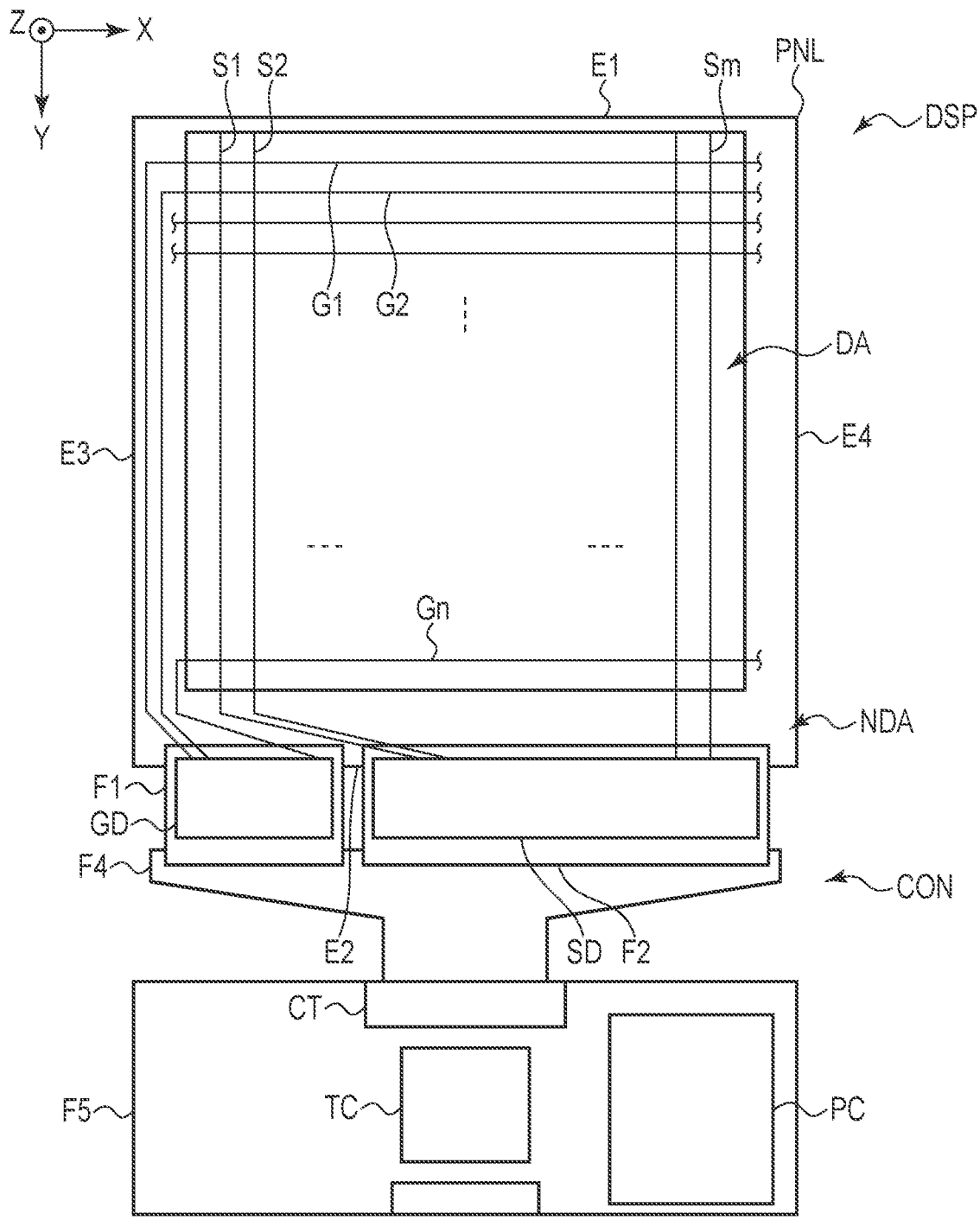
FIG. 2 is a plan view showing a configuration of a display device of the electronic device shown in FIG. 1.

FIG. 2 is a plan view showing a configuration of the display device DSP of the electronic device EA shown in FIG. 1.

As shown in FIG. 2, a first direction X and a second direction Y are directions intersecting each other, and a third direction Z is a direction intersecting the first direction X and the second direction Y. The first direction X corresponds to a row direction, and the second direction Y corresponds to a columnar direction. For example, the first direction X, the second direction Y, and the third direction Z are orthogonal to each other, but may intersect at an angle other than 90 degrees. In the present specification, a direction toward a distal part of an arrow indicating the third direction Z is referred to as upward (or, simply above) or forward, and a direction opposite to the distal part of the arrow is referred to as downward (or, simply below) or backward.

The display device DSP comprises the display panel PNL, wiring substrates F1, F2, F4, and F5, and the like. The display panel PNL includes the display area DA for displaying images and a frame-shaped non-display area NDA surrounding the display area DA. The display area DA includes n gate lines G (G1 to Gn), m source lines S (S1 to Sm), and the like. Incidentally, both n and m are positive integers, and n may be equal to m, or n may be different from m. The plurality of gate lines G extend in the first direction X and are arranged to be spaced apart in the second direction Y. In other words, the plurality of gate lines G extend in the row direction. The plurality of source lines S extend in the second direction Y and are arranged to be spaced apart in the first direction X. The display panel PNL includes end portions E1 and E2 along the first direction X and end portions E3 and E4 along the second direction Y.

The wiring substrate F1 includes a gate driver GD. The plurality of gate lines G are connected to the gate driver GD. The wiring substrate F2 includes a source driver SD. The plurality of source lines S are connected to the source driver SD. Each of the wiring substrates F1 and F2 is connected to the display panel PNL and the wiring substrate F4. The wiring substrate F5 includes a timing controller TC, a power supply circuit PC, and the like. The wiring substrate F4 is connected to a connector CT of the wiring substrate F5. Incidentally, the wiring substrates F1 and F2 may be replaced with single wiring substrates. Alternatively, the wiring substrates F1, F2, and F4 may be replaced with single wiring substrates. The gate driver GD, the source driver SD, and the timing controller TC described above constitute the control unit CON of the present embodiment, and the control unit CON is configured to control driving of each of the plurality of gate lines G, the plurality of source lines S, a plurality of pixel electrodes to be described later, a common electrode to be described later, the light source unit LU, and the camera CA.

Figure 3:
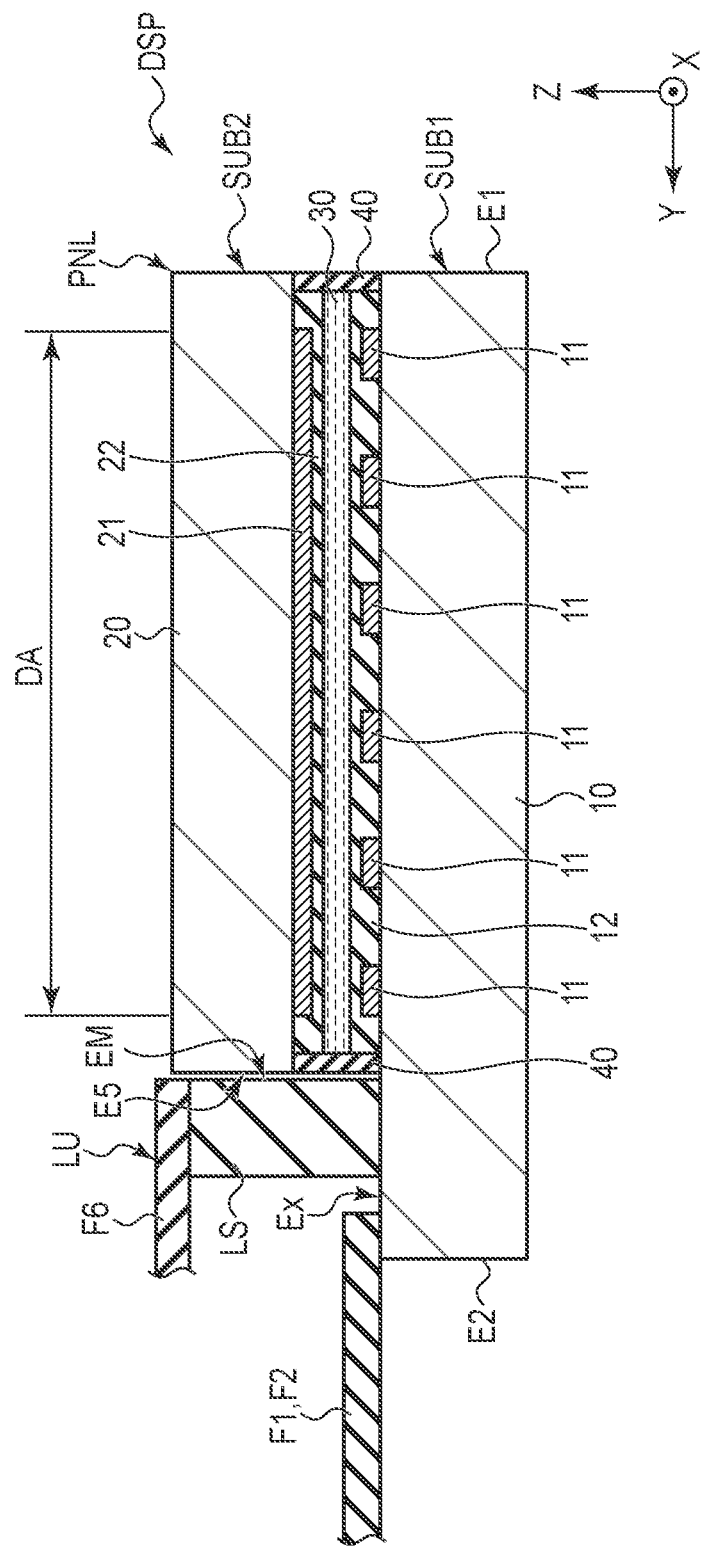
FIG. 3 is a cross-sectional view showing the display device shown in FIG. 2.

FIG. 3 is a cross-sectional view showing the display device DSP shown in FIG. 2. Main portions alone in the cross-section of the display device DSP in a Y-Z plane defined by the second direction Y and the third direction Z will be described here.

As shown in FIG. 3, the display panel PNL comprises a first substrate (first display substrate) SUB1, a second substrate (second display substrate) SUB2, a liquid crystal layer (display liquid crystal layer) 30 serving as a display function layer, and the like.

The first substrate SUB1 includes a transparent substrate 10, a plurality of pixel electrodes 11, an alignment film (first display alignment film) 12, and the like. The second substrate SUB2 includes a transparent substrate 20, a common electrode 21, an alignment film (second display alignment film) 22, and the like. The plurality of pixel electrodes 11 and the common electrode 21 are formed of, for example, a transparent conductive material such as indium tin oxide (ITO) or indium zinc oxide (IZO), and are located in the display area DA. Each of the alignment film 12 and the alignment film 22 is in contact with the liquid crystal layer 30.

The liquid crystal layer 30 is located in at least the display area DA. The liquid crystal layer 30 contains a polymer dispersed liquid crystal, and is held between the first substrate SUB1 and the second substrate SUB2. The liquid crystal layer 30 of the present embodiment uses reverse mode polymer dispersed liquid crystal (R-PDLC). The liquid crystal layer 30 maintains the parallelism of light to be made incident when a voltage to be applied is low, and scatters the light to be made incident when the voltage to be applied is high.

The first substrate SUB1 and the second substrate SUB2 are bonded by a sealing material 40. The first substrate SUB1 has an extending portion EX which further extends than an end portion E5 of the transparent substrate 20 in the second direction Y.

The wiring substrates F1 and F2 are connected to the extending portion EX of the first substrate SUB1.

The light source unit LU is located in the non-display area NDA outside the display area DA. The light source unit LU comprises a light emitting element LS, a wiring substrate F6, and the like. The light emitting element LS is connected to the wiring substrate F6 and is located on the extending portion EX. The light emitting element LS includes a light emitting portion (light emitting surface) EM opposed to the end portion E5. Illumination light emitted from the light emitting portion EM is made incident on the end portion E5 and propagates through the display panel PNL as described later.

FIG. 4 is a diagram showing main components of the display device DSP shown in FIG. 2.

As shown in FIG. 4, the display device DSP comprises a controller CNT indicated by a broken line in the drawing. The controller CNT includes a timing controller TC, a gate driver GD, a source driver SD, a Vcom circuit VC, a light source driver LSD, and the like.

The timing controller TC generates various signals, based on image data, synchronization signals, and the like input from the outside. For example, the timing controller TC outputs video signals generated by executing predetermined signal processing, based on the image data, to the source driver SD. In addition, the timing controller TC outputs the control signals generated based on the synchronization signals to each of the gate driver GD, the source driver SD, the Vcom circuit VC, and the light source driver LSD. Details of the timing controller TC will be described below.

The display area DA represented by a two-dot chain line in the drawing includes a plurality of pixels PX. Each of the pixels PX comprises a switching element SW and the pixel electrode 11. The switching element SW is formed of, for example, a thin-film transistor. The switching element SW is electrically connected to the gate line G and the source line S. The plurality of pixel electrodes 11 are located in the display area DA and are arrayed in a matrix. For this reason, for example, the plurality of pixel electrodes 11 are provided in a plurality of rows. The pixel electrode 11 is connected to the source line S via the switching element SW. The common electrode 21 is located in the display area DA. The common electrode 21 is opposed to the plurality of pixel electrodes 11. Unlike the present embodiment, the common electrode 21 may be divided for each of at least one pixel PX and connected to each common line, and a common voltage may be applied to the divided common electrodes.

A gate signal is supplied from the gate driver GD to each of the gate lines G. The video signal (image signal) is supplied from the source driver SD to each of the source lines S. A common voltage Vcom is supplied from the Vcom circuit VC to the common electrode 21. The video signal supplied to the source line S is applied to the pixel electrode 11 connected to the switching element SW in a period in which the switching element SW becomes a conductive state based on the gate signal supplied to the gate line G. In the following description, supplying the video signal to the pixel electrode 11 to form a potential difference between the pixel electrode 11 and the common electrode 21 may be referred to as writing the video signal (or applying the voltage) to the pixel PX comprising the pixel electrode 11.

The light source unit LU is configured to emit light to the liquid crystal layer 30. In the present embodiment, the light source unit LU is configured to emit light of a color other than achromatic color to the liquid crystal layer 30. The light source unit LU comprises light-emitting elements LS of a plurality of colors. For example, the light source unit LU comprises a light emitting element (first light emitting element) LSR which emits light of a first color to the liquid crystal layer 30, a light emitting element (second light emitting element) LSG which emits light of a second color to the liquid crystal layer 30, and a light emitting element (third light emitting element) LSB which emits light of a third color to the liquid crystal layer 30. It is needless to say that the first, second, and third colors are different from each other. In the present embodiment, the first color is red, the second color is green, and the third color is blue.

The light source driver LSD controls light emission periods of the light emitting elements LSR, LSG, and LSB. As described in detail later, in a drive scheme in which one frame period has a plurality of sub-frame periods, at least one of three light emitting elements LSR, LSG, and LSB is turned on in each sub-frame and the color of the illumination light is switched for each sub-frame.

A configuration example of the display device comprising the liquid crystal layer 30 which is a polymer dispersed liquid crystal layer will be hereinafter described.

Figure 5A:
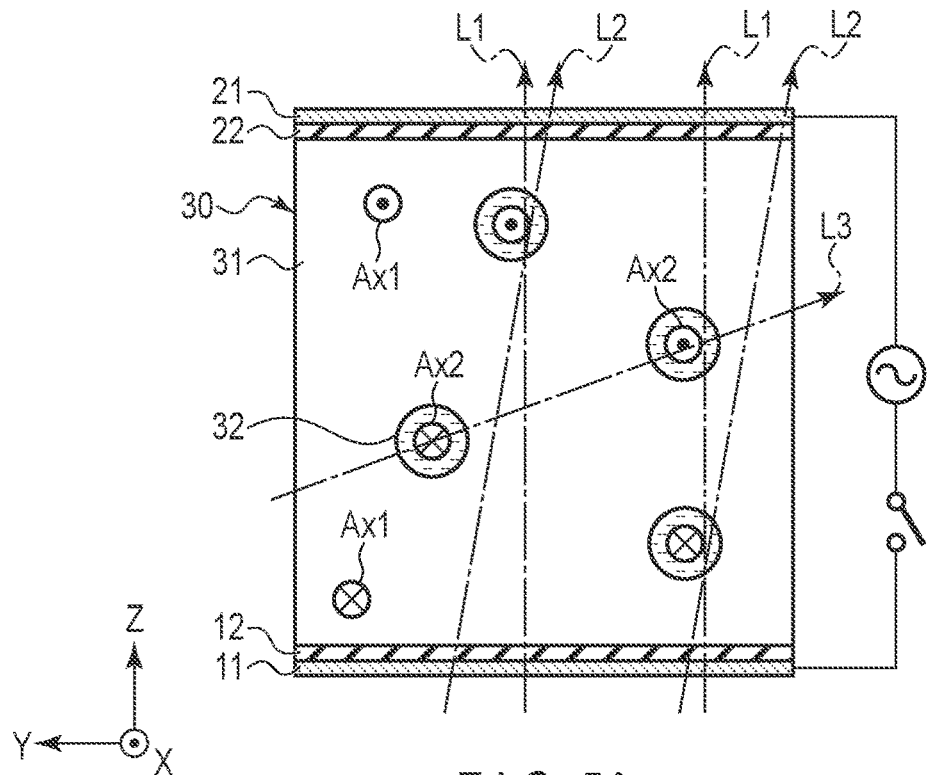
FIG. 5A is a diagram schematically showing a display liquid crystal layer in a transparent state.

FIG. 5A is a diagram schematically showing the liquid crystal layer 30 in a transparent state.

As shown in FIG. 5A, the liquid crystal layer 30 contains liquid crystalline polymers 31 and liquid crystalline molecules 32. The liquid crystalline polymer 31 can be obtained by, for example, polymerizing liquid crystalline monomer in a state in which the liquid crystalline monomer is aligned in a predetermined direction by the alignment restriction force of the alignment films 12 and 22. The liquid crystalline molecules 32 are dispersed in the liquid crystalline monomer, and are aligned in a predetermined direction depending on the alignment direction of the liquid crystalline monomer when the liquid crystalline monomer is polymerized. In the present embodiment, the alignment films 12 and 22 are horizontal alignment films that initially align the liquid crystalline monomer and the liquid crystalline molecules 32 along the X-Y plane defined by the first direction X and the second direction Y. The liquid crystalline molecules 32 are positive liquid crystalline molecules having positive dielectric anisotropy.

Unlike the present embodiment, however, the alignment films 12 and 22 may be vertical alignment films that initially align the liquid crystalline monomer and the liquid crystalline molecules 32 along the third direction Z. Alternatively, the liquid crystalline molecules 32 may be negative liquid crystalline molecules having negative dielectric anisotropy.

The liquid crystalline polymer 31 and the liquid crystalline molecules 32 have equivalent optical anisotropy. Alternatively, the liquid crystalline polymer 31 and the liquid crystalline molecules 32 have approximately equivalent refractive anisotropy. In other words, an ordinary refractive index and an extraordinary refractive index of each of the liquid crystalline polymer 31 and the liquid crystalline molecules 32 are approximately equal to each other. Incidentally, for both the ordinary refractive index and the extraordinary refractive index, values of the liquid crystalline polymer 31 and the liquid crystalline molecules 32 may not completely match each other, and a deviation caused by an error in manufacturing or the like is allowed. In addition, the liquid crystalline polymer 31 and the liquid crystalline molecules 32 are different in responsiveness to the electric field. In other words, the responsiveness of the liquid crystalline polymer 31 to the electric field is lower than the responsiveness of the liquid crystalline molecules 32 to the electric field.

The example shown in FIG. 5A corresponds to, for example, a state in which no voltage is applied to the liquid crystal layer 30 (for example, a state in which a potential difference between the pixel electrode 11 and the common electrode 21 is zero) or a state in which a second transparent voltage to be described below is applied to the liquid crystal layer 30.

As shown in FIG. 5A, an optical axis Ax1 of the liquid crystalline polymer 31 and an optical axis Ax2 of the liquid crystalline molecules 32 are parallel to each other. In the example illustrated, each of the optical axis Ax1 and the optical axis Ax2 is parallel to the first direction X. The optical axis mentioned herein corresponds to a line parallel to a direction of travel of the light beam in which the refractive index indicates one value irrespective of the direction of polarization.

As described above, since the liquid crystalline polymer 31 and the liquid crystalline molecules 32 have approximately equal refractive anisotropy and the optical axes Ax1 and Ax2 are parallel to each other, there is almost no refractive index difference between the liquid crystalline polymer 31 and the liquid crystalline molecules 32 in all directions including the first direction X, the second direction Y, and the third direction Z. For this reason, a light beam L1 made incident on the liquid crystal layer 30 in the third direction Z is transmitted without being substantially scattered in the liquid crystal layer 30. The liquid crystal layer 30 can maintain the parallelism of the light beam L1. Similarly, light beam L2 and light beam L3 made incident in an oblique direction angled with respect to the third direction Z are hardly scattered in the liquid crystal layer 30. For this reason, high transparency can be obtained. The state illustrated in FIG. 5A is referred to as a "transparent state".

Figure 5B:
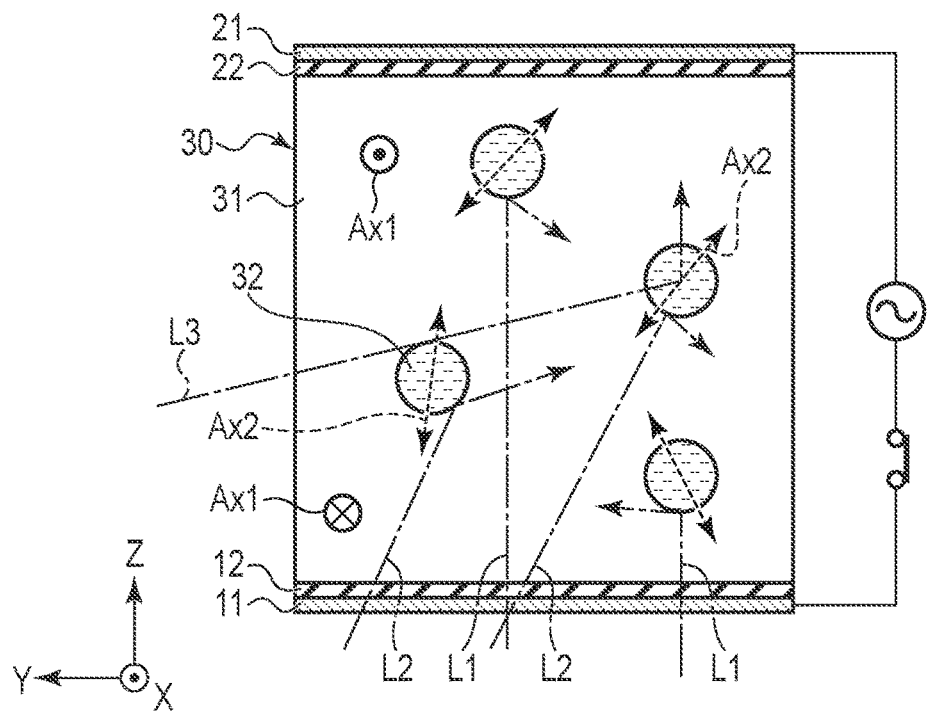
FIG. 5B is a diagram schematically showing a display liquid crystal layer in a scattered state.

FIG. 5B is a diagram schematically showing the liquid crystal layer 30 in a scattered state.

As shown in FIG. 5B, as described above, the responsiveness of the liquid crystalline polymer 31 to the electric field is lower than the responsiveness of the liquid crystalline molecule 32 to the electric field. For this reason, in a state in which a voltage (scattering voltage to be described later) higher than each of the second transparent voltage and a first transparent voltage to be described below is applied to the liquid crystal layer 30, the alignment direction of the liquid crystalline molecules 32 is changed in accordance with the electric field while the alignment direction of the liquid crystalline polymer 31 is hardly changed. In other words, as shown in the drawing, the optical axis Ax1 is substantially parallel to the first direction X while the optical axis Ax2 is angled with respect to the first direction X. For this reason, the optical axes Ax1 and Ax2 intersect each other. Therefore, a large refractive index difference is made between the liquid crystalline polymer 31 and the liquid crystalline molecules 32 in all the directions including the first direction X, the second direction Y, and the third direction Z. The light beams L1 to L3 made incident on the liquid crystal layer 30 are thereby scattered in the liquid crystal layer 30. The state shown in FIG. 5B is referred to as a "scattered state".

The control unit CON switches the state of the liquid crystal layer 30 to at least one of the transparent state and the scattered state.

Figure 6A:
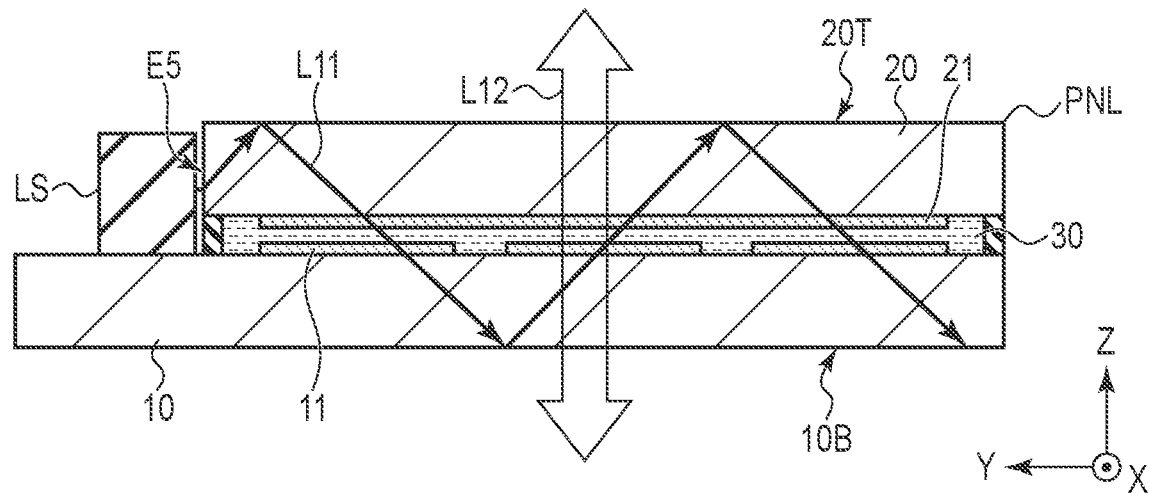
FIG. 6A is a cross-sectional view showing the display panel in a case where the display liquid crystal layer is in the transparent state.

FIG. 6A is a cross-sectional view showing the display panel PNL in a case where the liquid crystal layer 30 is in the transparent state. As shown in FIG. 6A, an illumination light beam L11 emitted from the light emitting element LS is made incident on the display panel PNL from the end portion E5 to propagate through the transparent substrate 20, the liquid crystal layer 30, the transparent substrate 10, and the like. In a case where the liquid crystal layer 30 is in the transparent state, since the illumination light L11 is hardly scattered by the liquid crystal layer 30, the illumination light hardly leaks from a lower surface 10B of the transparent substrate 10 and an upper surface 20T of the transparent substrate 20.

An external light beam (external light) L12 made incident on the display panel PNL is transmitted and hardly scattered in the liquid crystal layer 30. In other words, the external light beam made incident on the display panel PNL from the lower surface 10B is transmitted through the upper surface 20T, and the external light beam made incident from the upper surface 20T is transmitted through the lower surface 10B. For this reason, when observing the display panel PNL from the upper surface 20T side, the user can visually recognize a background on the lower surface 10B side through the display panel PNL. Similarly, when capturing the display panel PNL from the lower surface 10B side by the camera CA, the user can capture the subject on the upper surface 20T side through the display panel PNL.

Figure 6B:
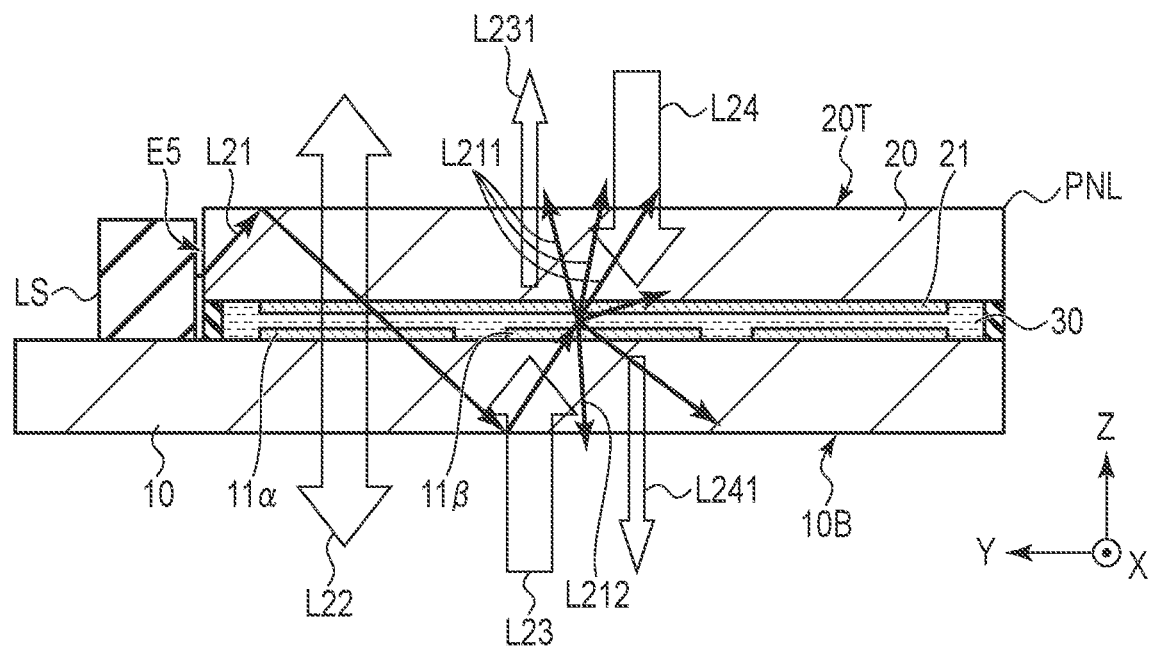
FIG. 6B is a cross-sectional view showing the display panel in a case where the liquid crystal layer is in the scattered state.

FIG. 6B is a cross-sectional view showing the display panel PNL in a case where the liquid crystal layer 30 is in the scattered state. As shown in FIG. 6B, an illumination light beam L21 emitted from the light emitting element LS is made incident on the display panel PNL from the end portion E5 to propagate through the transparent substrate 20, the liquid crystal layer 30, the transparent substrate 10, and the like. In the example illustrated, since the liquid crystal layer 30 between a pixel electrode 11a and the common electrode 21 (i.e., a liquid crystal area to which a voltage applied between the pixel electrode 11a and the common electrode 21 is applied) is in a transparent state, the illumination light beam L21 is hardly scattered in a liquid crystal area opposed to the pixel electrode 11a, in the liquid crystal layer 30. In contrast, since the liquid crystal layer 30 between a pixel electrode 11β and the common electrode 21 (i.e., a liquid crystal area to which a voltage applied between the pixel electrode 11β and the common electrode 21 is applied) is in the scattered state, the illumination light beam L21 is scattered in a liquid crystal area opposed to the pixel electrode 11β, in the liquid crystal layer 30. Of the illumination light beam L21, a scattered light beam L211 is emitted to the outside from the upper surface 20T, and a scattered light beam L212 is emitted to the outside from the lower surface 10B.

At a position overlapping with the pixel electrode 11a, an external light beam L22 made incident on the display panel PNL is transmitted and hardly scattered in the liquid crystal layer 30, similarly to the external light beam L12 shown in FIG. 6A. At a position overlapping with the pixel electrode 11β, a light beam L231 which is a part of an external light beam L23 made incident from the lower surface 10B is scattered in the liquid crystal layer 30 and then transmitted through the upper surface 20T. In addition, a light beam L241 which is a part of an external light beam L24 made incident from the upper surface 20T is scattered in the liquid crystal layer 30 and then transmitted through the lower surface 10B.

For this reason, a color of the illumination light beam L21 can be visually recognized at a position overlapping with the pixel electrode 11β when the display panel PNL is observed from the upper surface 20T side. In addition, since the external light beam L231 is transmitted through the display panel PNL, the background on the lower surface 10B side can also be visually recognized through the display panel PNL. Similarly, when the display panel PNL is captured from the lower surface 10B side by the camera CA, the camera CA detects the color of the illumination light L21 at the position overlapping with the pixel electrode 11β, which needs to be considered.

In addition, since the external light beam L241 is transmitted through the display panel PNL, in a case where the display panel PNL is captured from the lower surface 10B side by the camera CA, the subject on the upper surface 20T side can also be captured through the display panel PNL. At a position overlapping with the pixel electrode 11a, the color of the illumination light beam L21 can hardly be recognized visually and the subject can be captured through the display panel PNL since the liquid crystal layer 30 is in the transparent state.

Figure 7:
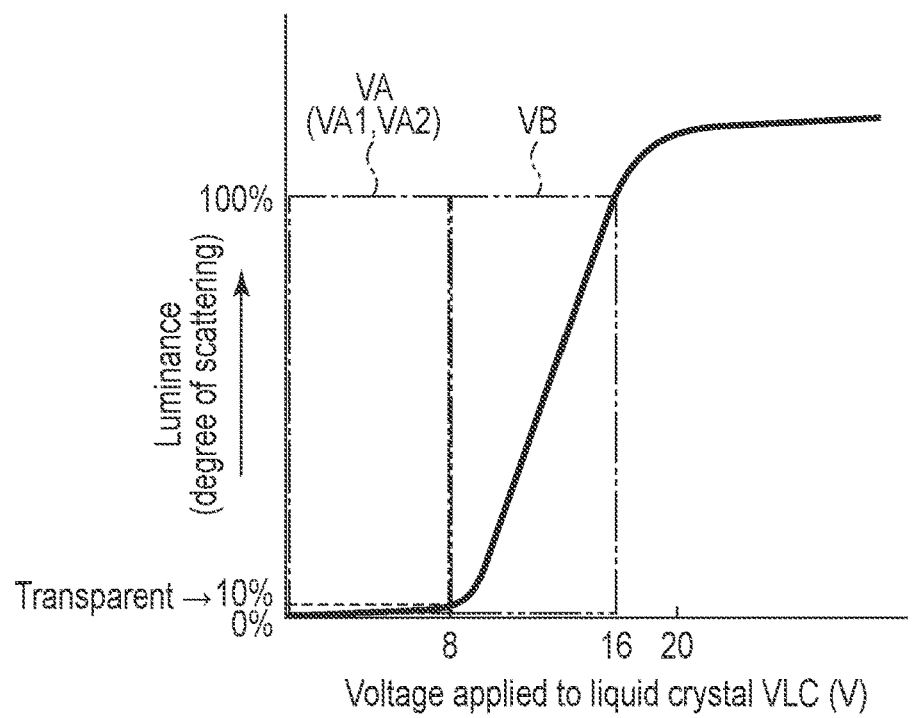
FIG. 7 is a graph showing scattering characteristics of the display liquid crystal layer.

FIG. 7 is a graph showing the scattering characteristic of the liquid crystal layer 30, indicating a relationship between the luminance and a voltage VLC applied to the liquid crystal layer 30. The luminance corresponds to luminance of the scattered light beam L211 obtained when the illumination light beam L21 emitted from the light emitting element LS is scattered in the liquid crystal layer 30 as shown in, for example, FIG. 6B. From another viewpoint, this luminance represents a scattering degree of the liquid crystal layer 30.

As shown in FIG. 7, when the voltage VLC is increased from 0V, the luminance is rapidly increased from approximately 8V and is saturated at approximately 20V. The luminance is slightly increased even if the voltage VLC is in a range from 0V to 8V. In the present embodiment, the voltage in an area surrounded by a two-dot-chained line, i.e., a range from 8V to 16V is used for reproduction of gradation (for example, 256 gradation) of each pixel PX. The voltage in a range 8V<VLC≤16V is hereinafter referred to as a "scattering voltage". In addition, in the present embodiment, the voltage in an area surrounded by one-dot-chained line, i.e., a range 0V≤VLC≤8V is referred to as a "transparent voltage". The transparent voltage VA includes the first transparent voltage VA1 and the second transparent voltage VA2 described above. The lower limit and the upper limit of the scattering voltage VB and the transparent voltage VA are not limited to this example, but can arbitrarily be determined in accordance with the scattering property of the liquid crystal layer 30.

The degree of scattering in a case where the scattering voltage VB is applied to the liquid crystal layer 30 and the degree of scattering of the light made incident on the liquid crystal layer 30 is the highest is assumed to be 100%. The degree of scattering in a case where the scattering voltage VB of 16V is applied to the liquid crystal layer 30 is assumed to be 100%. For example, the transparent voltage VA can be defined as a voltage in a range of the voltage VLC with the degree of scattering (luminance) less than 10%. Alternatively, the transparent voltage VA can also be defined as the voltage VLC lower than or equal to a voltage (8V in the example of FIG. 7) corresponding to the lowest gradation.

In addition, the transparent voltage VA (first transparent voltage VA1 and second transparent voltage VA2) may be different from that in the example shown in FIG. 7. For example, the first transparent voltage VA1 may be a voltage with the degree of scattering in a range of 10% or more and 50% or less. In addition, the second transparent voltage VA2 may be a voltage with the degree of scattering in a range lower than 10%.

The graph shown in FIG. 7 is applicable to a case where the polarity of the voltage applied to the liquid crystal layer 30 is positive polarity (+) or negative polarity (−). In the latter case, the voltage VLC is an absolute value of the negative-polarity voltage.

Figure 8A:
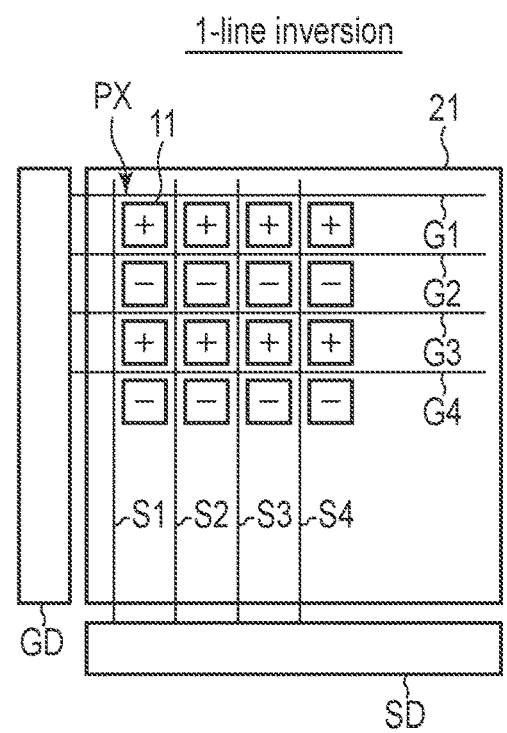
FIG. 8A is a diagram showing an outline of a one-line inversion drive scheme.
Figure 8B:
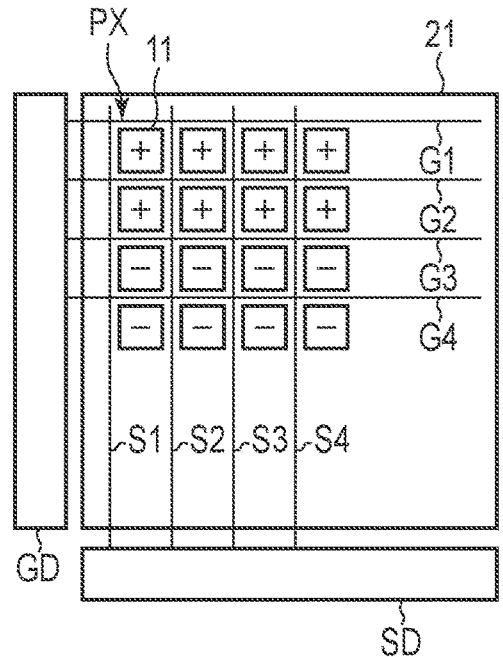
FIG. 8B is a diagram showing an outline of a two-line inversion drive scheme.
Figure 8C:
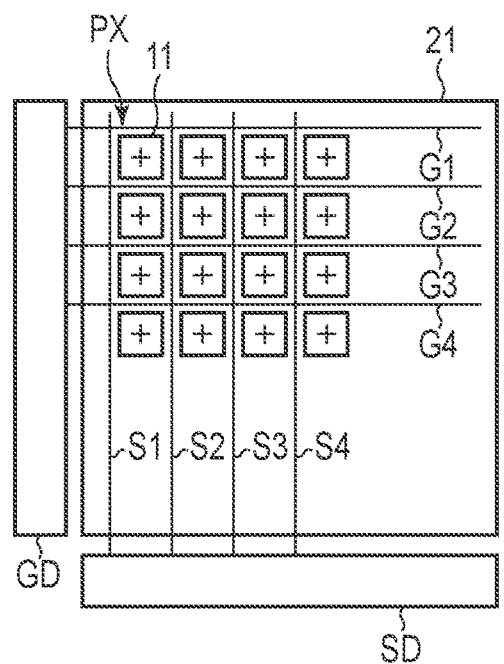
FIG. 8C is a diagram showing an outline of a frame-inversion drive scheme.

The polarity inversion drive scheme of inverting the polarity of the voltage applied to the liquid crystal layer 30 can be applied to the display device DSP. FIG. 8A, FIG. 8B, and FIG. 8C are views showing a summary of the polarity inversion drive scheme.

FIG. 8A shows one-line inversion drive scheme of inverting the positive polarity (+) and the negative polarity (−) of the voltage applied to the liquid crystal layer 30 (i.e., the voltage written to the pixel PX) in each group of pixels PX (one line) connected to one gate line G. In such a drive scheme, for example, the polarity of the common voltage supplied to the common electrode 21 and the polarity of the video signal supplied from the source driver SD to the source line S (i.e., polarity of a source line voltage) are inverted for each horizontal period in which the gate driver GD supplies the gate signal to the gate line G. In the same horizontal period, the polarity of the common voltage and the polarity of the video signal are, for example, opposite to each other.

FIG. 8B shows two-line inversion drive scheme of inverting the positive polarity (+) and the negative polarity (−) of the voltage to be applied to the liquid crystal layer 30 in every two lines. The present invention is not limited to the example shown in FIG. 8A and FIG. 8B, but the polarity may be inverted in every three or more lines.

FIG. 8C shows a frame-inversion drive scheme of inverting the voltage applied to the liquid crystal layer 30 to the positive polarity (+) or the negative polarity (−) in each frame period for displaying an image corresponding to one piece of image data. In such a drive method, for example, the polarity of the common voltage and the polarity of the video signal are inverted in each frame period. In the same frame period, for example, the polarity of the common voltage and the polarity of the video signal are opposite to each other. The present invention is not limited to the example shown in FIG. 8C, but the polarity may be inverted in each sub-frame.

Figure 9:
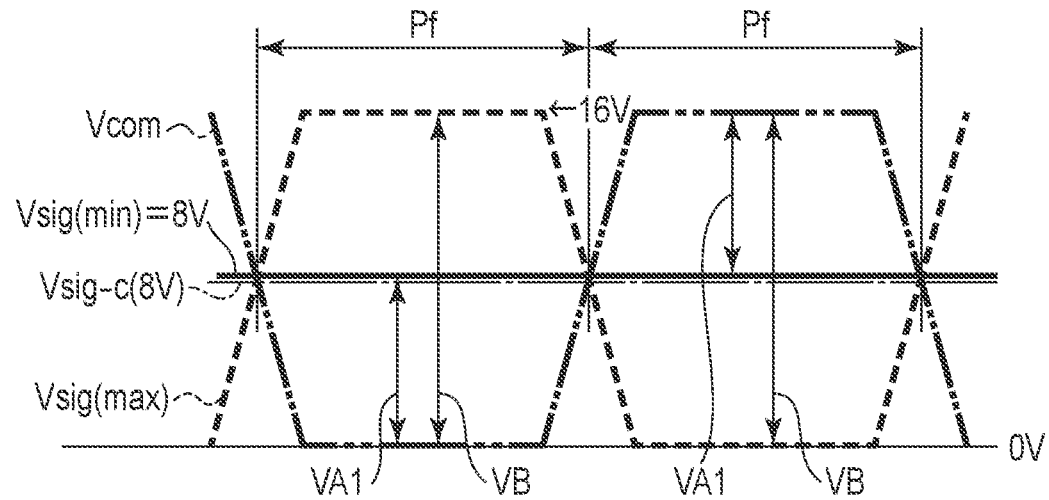
FIG. 9 is a chart showing an example of a common voltage and a source line voltage in the display drive.

FIG. 9 is a chart showing an example of the common voltage Vcom supplied to the common electrode 21 and the source line voltage Vsig supplied to the source line S (or the pixel electrode 11) in the display drive to which the one-line inversion drive scheme shown in FIG. 8A is applied.

As shown in FIG. 9, a waveform corresponding to a maximum value (max) of gradation and a waveform corresponding to a minimum value (min) of gradation are illustrated with respect to the source line voltage Vsig. The waveform of the source line voltage Vsig (min) is represented by a solid line, the waveform of the common voltage Vcom is represented by a two-dot-chained line, and the waveform of the source line voltage Vsig (max) is represented by a broken line. In the example of this drawing, the polarities of the common voltage Vcom and the source line voltage Vsig (see the waveform of the maximum value) are inverted in each frame period Pf. Reference voltage Vsig-c is, for example, 8V. The lower limit is 0V and the upper limit is 16V in each of the common voltage Vcom and the source line voltage Vsig.

However, when the frame period Pf includes a plurality of sub-frame periods, the polarity of the common voltage Vcom and the polarity of the source line voltage Vsig may be inverted in each frame period Pf, or may be inverted in each field period (sub-frame period).

The polarity inversion drive scheme including not only the example shown in FIG. 9, but the example of FIG. 10 to be described later will be focused. If the drive voltage to be applied to the liquid crystal layer 30 (voltage to be written to the pixel PX) has positive polarity, a difference (Vsig−Vcom) between the source line voltage Vsig and the common voltage Vcom becomes 0V or a positive voltage value. In contrast, if the drive voltage to be applied to the liquid crystal layer 30 (voltage to be written to the pixel PX) has negative polarity, the difference (Vsig−Vcom) between the source line voltage Vsig and the common voltage Vcom is 0V or a negative voltage value.

The polarity inversion drive scheme shown in FIG. 9 will be focused. In a period in which the positive-polarity voltage is written to the pixel PX, the common voltage Vcom becomes 0V, and the source line voltage Vsig becomes a voltage value corresponding to gradation indicated by image data in a range of 8V or more and 16V or less. In contrast, in a period in which the negative-polarity voltage is written to the pixel PX, the common voltage Vcom becomes 16V, and the source line voltage Vsig becomes a voltage value corresponding to gradation indicated by image data in a range of 0V or more and 8V or less. In other words, in either of the cases, the voltage of 8V or more and 16V or less is applied between the common electrode 21 and the pixel electrode 11.

As shown in FIG. 7, even if the voltage VLC to be applied to the liquid crystal layer 30 is 8V, i.e., even if the first transparent voltage VA1 is applied to the liquid crystal layer 30, the liquid crystal layer 30 has the degree of scattering of approximately 0 to 10%. Therefore, even if the source line voltage Vsig is the minimum value of the gradation, the external light beam made incident on the display panel PNL may be slightly scattered and the visibility of the background of the display panel PNL may be lowered.

For this reason, as described later, the visibility of the background of the display panel PNL can be improved by applying the transparent drive of making the voltage between the pixel electrode 11 and the common electrode 21 smaller than the lower limit of gradation (i.e., drive in a reset period to be described later) to the sequence of image display. Furthermore, the subject can be captured more clearly through the display panel PNL by the camera CA.

A relationship between the common voltage Vcom and the output of the source driver SD will be described here.

When a withstand voltage of the source driver SD is low, the common voltage Vcom is inversely driven to increase the liquid crystal applied voltage. At this time, the source driver SD can simultaneously output only one of the positive-polarity source line voltage Vsig (for example, reference voltage Vsig-c to 16V) and the negative-polarity source line voltage Vsig (for example, 0V to reference voltage Vsig-c). In addition, the polarity of the common voltage Vcom is opposite to the polarity of the output of the source driver SD.

However, when the source driver SD of a high withstand voltage is used, the relationship between the source line voltage Vsig and the common voltage Vcom may be the same as the above-described relationship but may also be a relationship to be described below. In other words, the common voltage Vcom is fixed to 0V, and the source line voltage Vsig output from the source driver SD is in a range between 0 and +16V at the positive polarity or a range between −16 and 0V at the negative polarity.

Figure 10:
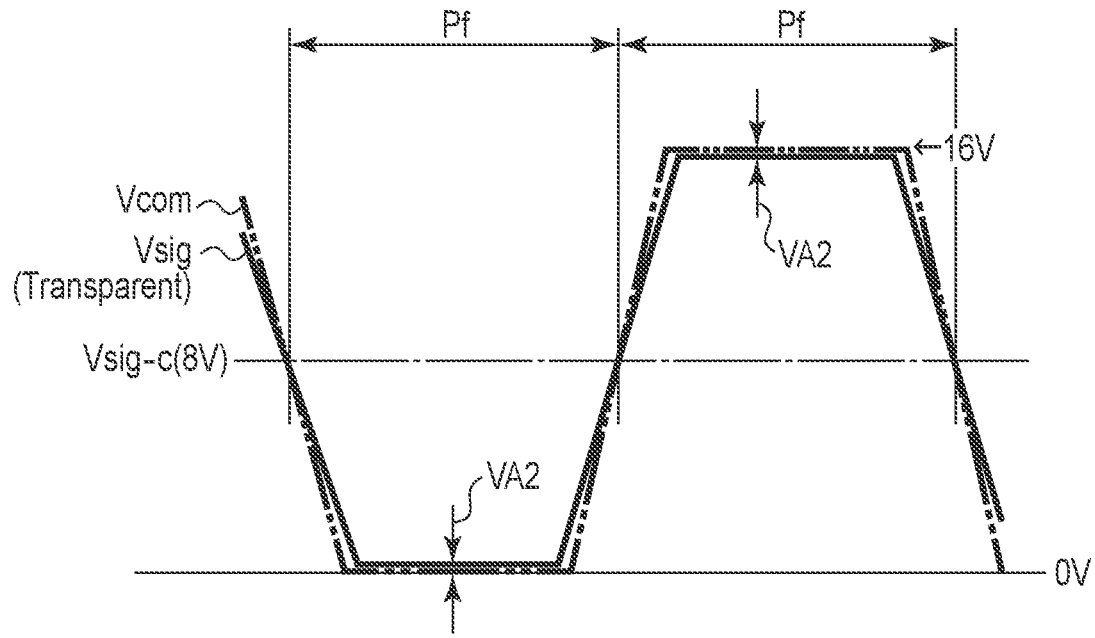
FIG. 10 is a chart showing an example of a common voltage and a source line voltage in the transparent drive.

FIG. 10 is a chart showing an example of the common voltage Vcom and the source line voltage Vsig in the transparent drive. The waveform of the source line voltage Vsig is represented by a solid line, and the waveform of the common voltage Vcom is represented by a two-dot-chained line.

As shown in FIG. 10, the common voltage Vcom is switched alternately to 0V and 16V in each frame period Pf, similarly to the example shown in FIG. 9. In the transparent drive, the voltage value of the source line voltage Vsig matches the common voltage Vcom (Vsig=Vcom=0V or Vsig=Vcom=16V) in each frame period Pf. In FIG. 10, in view of a relationship in illustration between the source line voltage Vsig and the common voltage Vcom, both are slightly shifted. For this reason, the voltage of 0V is applied to the liquid crystal layer 30. In other words, the second transparent voltage VA2 is applied to the liquid crystal layer 30.

However, the source line voltage Vsig in the transparent drive is not limited to the example shown in FIG. 10. For example, the source line voltage Vsig may be higher than 0V and less than 8V (0V<Vsig<8V) in a period when the common voltage Vcom becomes 0V. The source line voltage Vsig may be higher than 8V and less than 16V (8V<Vsig<16V) in a period when the common voltage Vcom becomes 16V. In either of the cases, according to the transparent drive, an absolute value of the difference between the source line voltage Vsig and the common voltage Vcom is less than 8V and the parallelism of the light transmitted through the liquid crystal layer 30 is increased. In other words, the second transparent voltage VA2 is not limited to 0V, but an absolute value of the second transparent voltage VA2 may be less than 8V.

Incidentally, in the transparent drive, the voltage to be applied to the liquid crystal layer 30 may be less than the lower limit (for example, 8V) of the gradation, and the source line voltage Vsig may not completely match the common voltage Vcom. As described above, the degree of scattering in a case where the degree of scattering of the light made incident on the liquid crystal layer 30 is the highest when the scattering voltage VB is applied to the liquid crystal layer 30 is assumed to be 100%. For example, the second transparent voltage VA2 is desirably a voltage having the degree of scattering lower than 10%.

Figure 11:
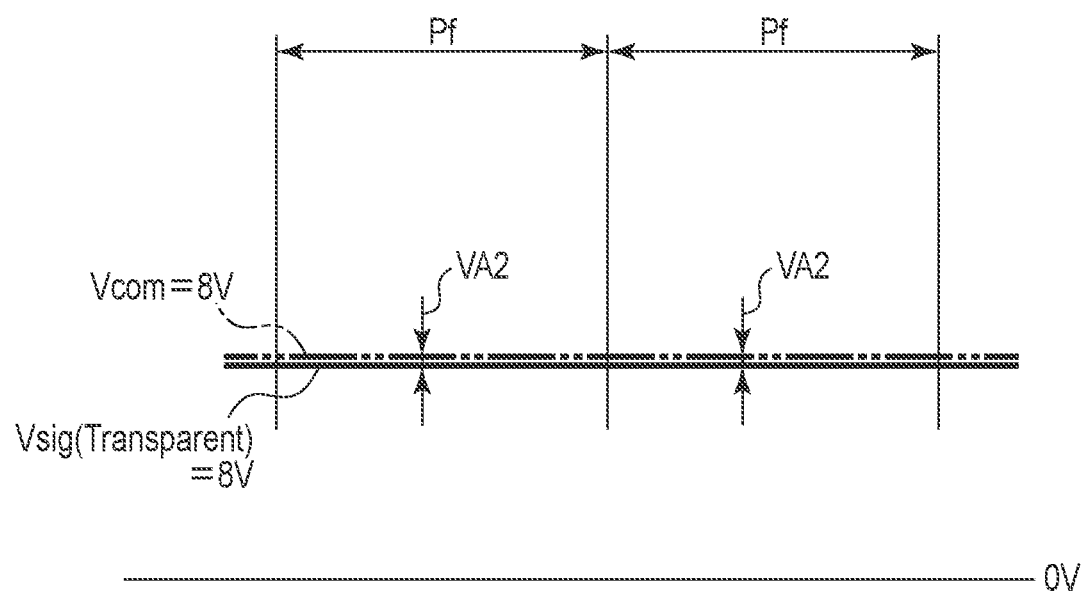
FIG. 11 is a chart showing another example of the common voltage and the source line voltage in the transparent drive.

FIG. 11 is a chart showing another example of the common voltage Vcom and the source line voltage Vsig in the transparent drive. The waveform of the source line voltage Vsig is represented by a solid line, and the waveform of the common voltage Vcom is represented by a two-dot-chained line.

As shown in FIG. 11, in this example, the polarity inversion of the common voltage Vcom and the source line voltage Vsig is stopped in the transparent drive. Furthermore, the common voltage Vcom and the source line voltage Vsig match at 8V (above reference voltage Vsig-c). The common voltage Vcom and the source line voltage Vsig may match at a voltage other than the reference voltage Vsig-c, such as 0V. In addition, the second transparent voltage VA2 is desirably a voltage having the degree of scattering lower than 10%, similarly to the case shown in FIG. 10.

The one-line inversion drive scheme has been described above as the example of the transparent drive, but similar transparent drive can be applied to a line-inversion drive scheme of two or more lines and a frame inversion drive scheme.

Next, a control example of the electronic device EA incorporating the transparent drive will be described with reference to FIG. 12 to FIG. 18. A drive scheme in which one frame period includes a plurality of sub-frame (field) periods will be applied to the display device DSP. Such a drive scheme is referred to as, for example, field sequential system. Red, green, and blue images are selectively displayed in each of the sub-frame periods. The images of the colors displayed in time division are mixed and visually recognized as multi-color display image for the user.

FIG. 12 is a diagram showing a configuration example of the timing controller TC shown in FIG. 4.

As shown in FIG. 12, the timing controller TC comprises a timing generation unit 50, a frame memory 51, line memories 52R, 52G, and 52B, a data conversion unit 53, a light source control unit 54, a detection unit 55 serving as an address detection unit, and the like.

The frame memory 51 stores image data for one frame input from the outside. The line memories 52R, 52G, and 52B store sub-frame data of red, green, and blue colors, respectively. Pieces of the sub-frame data represent red, green, and blue images (for example, gradation values of the pixels PX) which the pixels PX are urged to display in time division. The sub-frame data of each of the colors stored in the line memories 52R, 52G, and 52B corresponds to a previous frame of the image data stored in the frame memory 51. The data conversion unit 53 generates a video signal by executing various types of data conversion processing such as gamma correction on the sub-frame data of each color stored in the line memories 52R, 52G, and 52B, and outputs the video signal to the above-described source driver SD. The timing controller TC may be configured to send RGB data to the data conversion unit 53 by allocating the RGB data in the frame memory 51. In this case, the timing controller TC can also be configured without the line memories 52R, 52G, and 52B.

The light source control unit 54 outputs the light source control signal to the above-described light source driver LSD. The light source driver LSD drives the light emitting elements LSR, LSG, and LSB, based on the light source control signal. The light emitting elements LSR, LSG, and LSB can be driven under, for example, pulse width modulation (PWM) control. In other words, the light source driver LSD can adjust the luminance of each of the light emitting elements LSR, LSG, and LSB with the duty ratios of the signals output to the light emitting elements LSR, LSG, and LSB.

The timing generation unit 50 controls operation timing of the frame memory 51, the line memories 52R, 52G, and 52B, the data conversion unit 53, and the light source control unit 54 in synchronization with a vertical synchronization signal Vsync and a horizontal synchronization signal Hsync which are input from the outside. In addition, the timing generation unit 50 controls the source driver SD by outputting a source driver control signal, controls the gate driver GD by outputting a gate driver control signal, and outputs a Vcom control signal.

The detection unit 55 is configured, when image data for one frame input from the outside includes data of an image, to detect an address of the data of the image. Examples of the image include an image of the partner, a character displayed in a part of the display area DA, and the like. Examples of the character include a symbol including a letter, a figure, an icon, and the like. In addition, a case where data of the character is included in the image data means a case where data other than 0 is included in at least one piece of all bits of digital data. Address information of the data of the image is supplied to the data conversion unit 53. For this reason, when the image data input from the outside includes the data of the image, the timing controller TC can generate the processed video signal and output the processed video signal to the source driver SD in order to adjust the degree of scattering (transparency) of an area other than the area where the image is displayed. Generation of the processed video signal can be executed by calculation of the data conversion unit 53 or can be executed by using data stored in a table 56 of the timing controller TC.

Figure 13:
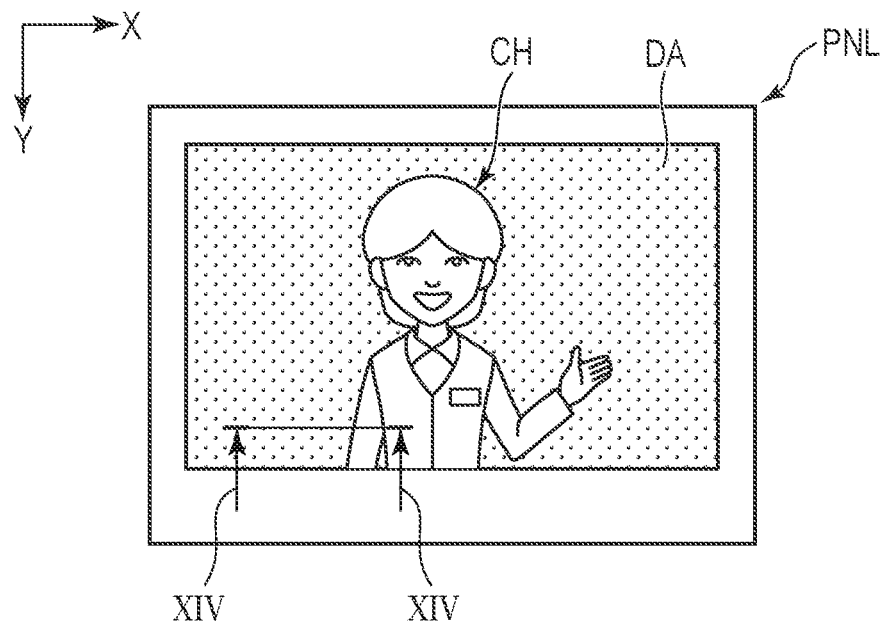
FIG. 13 is a plan view showing the display panel, illustrating a usage example of the electronic device, and a state in which a scattering voltage and a first transparent voltage are applied to a display liquid crystal layer and an image is displayed in a display area of the display panel.

An example of displaying an image in the display area DA of the display panel PNL will be described. FIG. 13 is a plan view showing the display panel PNL, a diagram illustrating a usage example of the electronic device EA, and a diagram showing a state in which the scattering voltage VB and the first transparent voltage VA1 are applied to the liquid crystal layer 30 and an image is displayed in the display area DA of the display panel PNL.

It is assumed that, as shown in FIG. 13, each of the user and the partner holds an online conference by using the electronic device EA and the user is viewing the partner displayed in the display area DA. Both the user and the partner are holding the conference while viewing the screen. For this reason, the user can make eye contact with the partner displayed on the screen and can confirm a partner's gesture.

The scattering voltage VB higher than or equal to a predetermined voltage of a gradation voltage is applied to each pixel in an area overlapping with a partner's image CH. In addition, in this example, the first transparent voltage VA1 is supplied to each pixel in an area which does not overlap with the partner's image. Incidentally, the above first transparent voltage VA1 is a voltage in a predetermined range in the vicinity where the gradation reproduction of the gradation voltage can be executed.

In the area which overlaps with the partner's image CH, since the display area DA (liquid crystal layer 30) of the display panel PNL scatters not only the illumination light of the light source unit LU, but also the external light beam, the user can hardly visually recognize the modulating element MO through the display area DA.

Figure 14:
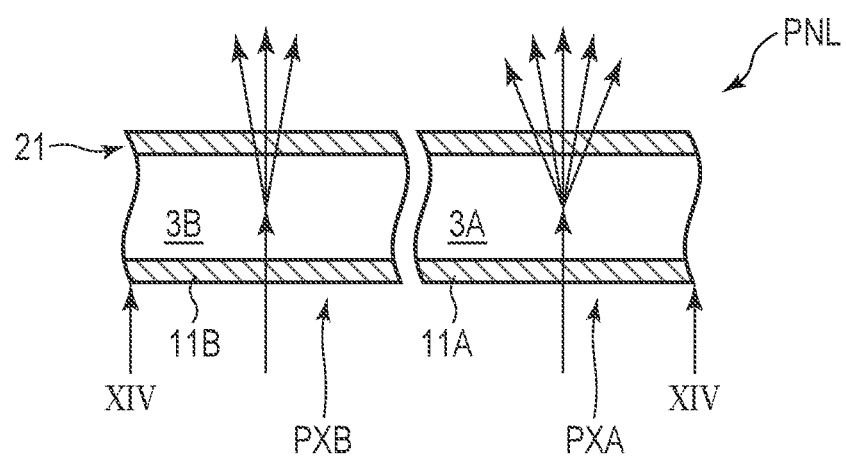
FIG. 14 is a cross-sectional view showing the display panel in FIG. 13 along line XIV-XIV.

FIG. 14 is a cross-sectional view showing the display panel PNL in FIG. 13 along line XIV-XIV. FIG. 14 illustrates only parts of the display panel PNL necessary for description. In addition, FIG. 14 illustrates an optical path, and also illustrates a scene where light is diffused by the liquid crystal layer 30 and a scene where the parallelism of light is maintained by the liquid crystal layer 30.

As shown in FIG. 14, the plurality of pixels PX of the display panel PNL include a first pixel PXA and a second pixel PXB. The first pixel PXA includes a first pixel electrode 11A, and the second pixel PXB includes a second pixel electrode 11B.

The liquid crystal layer 30 (display function layer) includes a plurality of liquid crystal areas 3 (display function areas). The liquid crystal layer 30 includes a first liquid crystal area 3A (first display function area) where a voltage applied between the first pixel electrode 11A and the common electrode 21 is applied, and a second liquid crystal area 3B (second display function area) where a voltage applied between the second pixel electrode 11B and the common electrode 21 is applied. In the present embodiment, the first liquid crystal area 3A is sandwiched between the first pixel electrode 11A and the common electrode 21, and the second liquid crystal area 3B is sandwiched between the second pixel electrode 11B and the common electrode 21.

A voltage is applied between one corresponding pixel electrode 11 of the plurality of pixel electrodes 11 and the common electrode 21, and the scattering voltage VB and the transparent voltage (first transparent voltage VA1) are thus selectively applied to each of the liquid crystal areas 3 (display function areas).

The liquid crystal layer 30 (liquid crystal area 3) scatters the light which is made incident when the scattering voltage VB is applied, and maintains the parallelism of the light which is made incident when the first transparent voltage VA1 is applied. The parallelism of the external light beam transmitted through each of the liquid crystal areas 3 when the transparent voltage (first transparent voltage VA1) is applied is higher than the parallelism of the external light beam transmitted through each of the liquid crystal areas 3 when the scattering voltage VB is applied. In addition, the degree of scattering of the external light beam transmitted through the liquid crystal area 3 when the scattering voltage VB is applied is higher than the degree of scattering of the external light beam transmitted through the liquid crystal area 3 when the transparent voltage (first transparent voltage VA1) is applied.

As shown in FIG. 13 and FIG. 14, in a period in which the image is displayed, the first pixel PXA is located in the area overlapping with the partner's image CH, and the scattering voltage VB is supplied to the first liquid crystal area 3A. In contrast, the second pixel PXB is located in the area which does not overlap with the partner's image CH, and the first transparent voltage VA1 is supplied to the second liquid crystal area 3B. In the present embodiment, since the liquid crystal layer 30 uses a reverse mode polymer dispersed liquid crystal, the scattering voltage VB is higher than the first transparent voltage VA1. Unlike the present embodiment, however, when the liquid crystal layer 30 uses a normal mode polymer dispersed liquid crystal, the first transparent voltage VA1 is higher than the scattering voltage VB.

One frame period of the period in which the images are displayed in the display area DA will be focused. The control unit CON applies a voltage between each of the plurality of pixel electrodes 11 and the common electrode 21 in a write period, selectively applies the scattering voltage VB and the transparent voltage (first transparent voltage VA1) to the plurality of liquid crystal areas 3, and prohibits the light emission executed by the light source unit LU.

The control unit CON holds a state in which the scattering voltage VB and the transparent voltage (first transparent voltage VA1) are selectively applied to the plurality of liquid crystal areas 3 in a light emission period which is independent of the write period and subsequent to the write period, permits the light emission executed by the light source unit LU, emits light to the liquid crystal layer 30, and scatters the light emitted by the light source unit LU in the plurality of liquid crystal areas 3 to which the scattering voltage VB is applied, among the plurality of liquid crystal areas 3. As a result, the control unit CON can display the images in the display area DA. The control unit CON switches the modulating element MO to the light-shielding state in the light emission period.

The color of the image displayed in the display area DA (for example, the color of the first pixel PXA) is based on the color emitted by the light source unit LU. For this reason, the control unit CON can set the color of the image to a single color emitted by the light source unit LU or a color mixture of a plurality of colors emitted by the light source unit LU. In addition, it is also possible to display all the images in a single color or display the images in different colors for each part.

A degree of scattering of light in the first liquid crystal area 3A is higher than a degree of scattering of light in the second liquid crystal area 3B. The first liquid crystal area 3A becomes a scattered state. For this reason, when the background is viewed through the display panel PNL, the visibility of the background can most degrade in the area which overlaps with the partner's image CH.

In contrast, the parallelism of light passing through the second liquid crystal area 3B is higher than the parallelism of light passing through the first liquid crystal area 3A. The second liquid crystal area 3B becomes a first transparent state. Light is slightly scattered in the second liquid crystal area 3B.

When the background is viewed through the display panel PNL, the background can be blurred in the area which does not overlap with the partner's image and the visibility of the background in the area which does not overlap with the partner's image can be degraded, such that the user can visually recognize the partner's image easily.

When the partner's background is not black, unlike the present embodiment, the scattering voltage VB may be applied to the second liquid crystal area 3B to set the second liquid crystal area 3B in the scattered state.

Figure 15:
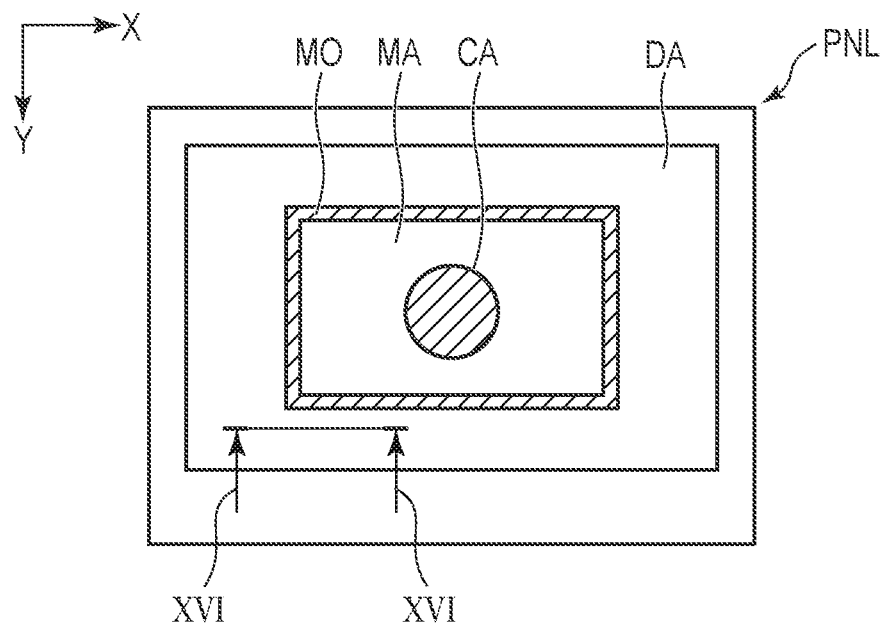
FIG. 15 is a plan view showing the display panel, illustrating the usage example of the electronic device, and a state in which a second transparent voltage is applied to the display liquid crystal layer to set the display area (display liquid crystal layer) of the display panel to a second transparent state such that the camera is viewed through the display panel.

Next, an example of capturing the subject more clearly through the display panel PNL and the modulating element MO by the camera CA by incorporating the transparent drive (drive in the reset period) for setting the voltage between the pixel electrode 11 and the common electrode 21 to be smaller than, for example, the lower limit of the gradation into the sequence of the image display will be described. Incidentally, the visibility of the background of the display panel PNL can also be improved by setting the reset period. FIG. 15 is a plan view showing the display panel PNL, illustrating a usage example of the electronic device EA, and a state in which the second transparent voltage VA2 is applied to the liquid crystal layer 30 to set the display area DA (liquid crystal layer 30) of the display panel PNL to the second transparent state such that the modulating element MO and the camera CA are viewed through the display panel PNL.

As shown in FIG. 15, the second transparent voltage VA2 is supplied to each pixel of the display area DA in the reset period which is independent of the write period and the light emission period. Since the write period, the light emission period, and the reset period are switched at a high speed, the user's line of sight is directed to the display area DA of the display panel PNL even in the reset period. For this reason, the user can naturally direct its own line of sight toward the camera. In the reset period, the parallelism of the external light beam can be increased in the display area DA (liquid crystal layer 30) of the display panel PNL. In the reset period, the modulation area MA of the modulating element MO is switched to the transmissive state. For this reason, not only the modulating element MO, but also the camera CA behind the modulation area MA are viewed in the reset period.

Figure 16:
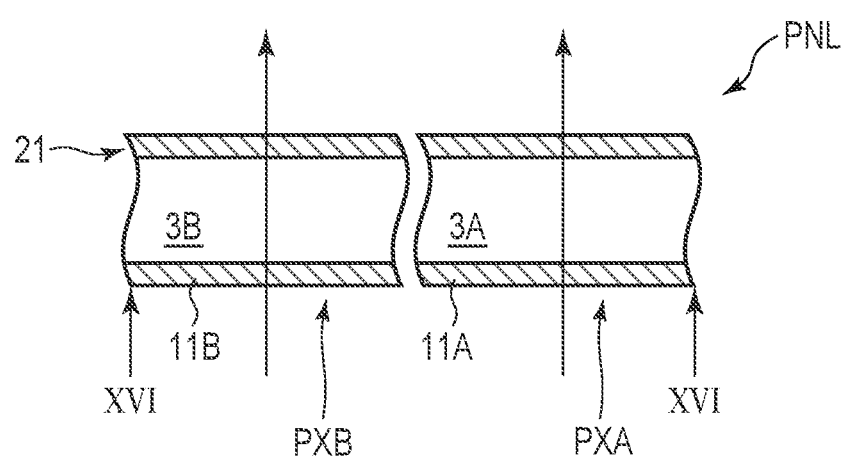
FIG. 16 is a cross-sectional view showing the display panel in FIG. 15 along line XVI-XVI.

FIG. 16 is a cross-sectional view showing the display panel PNL in FIG. 15 along line XVI-XVI. FIG. 16 illustrates only parts of the display panel PNL necessary for description. In addition, FIG. 16 illustrates an optical path, and illustrates a scene where the parallelism of light is maintained in the liquid crystal layer 30.

As shown in FIG. 16, the first pixel PXA and the second pixel PXB are the same as the first pixel PXA and the second pixel PXB shown in FIG. 14, respectively. A transparent voltage (second transparent voltage VA2) is applied to each of the liquid crystal areas 3 (display function areas) by applying a voltage between one corresponding pixel electrode 11 of the plurality of pixel electrodes 11 and the common electrode 21.

The liquid crystal layer 30 (liquid crystal area 3) maintains the parallelism of light made incident when the second transparent voltage VA2 is applied. The parallelism of the external light beam transmitted through each of the liquid crystal areas 3 when the second transparent voltage VA2 is applied is higher than the parallelism of the external light beam transmitted through each of the liquid crystal areas 3 when the first transparent voltage VA1 is applied. In addition, the degree of scattering of the external light beam transmitted through each of the liquid crystal areas 3 when the second transparent voltage VA2 is applied is lower than the degree of scattering of the external light beam transmitted through each of the liquid crystal areas 3 when the first transparent voltage VA1 is applied.

Unlike the present embodiment, however, the first transparent voltage VA1 and the second transparent voltage VA2 may match. In this case, the parallelism of the external light beam transmitted through each of the liquid crystal areas 3 when the second transparent voltage VA2 is applied is the same as the parallelism of the external light beam transmitted through each of the liquid crystal areas 3 when the first transparent voltage VA1 is applied.

As shown in FIG. 15 and FIG. 16, in the reset period, the second transparent voltage VA2 is supplied to the plurality of liquid crystal areas 3 including the first liquid crystal area 3A of the first pixel PXA and the second liquid crystal area 3B of the second pixel PXB. In the present embodiment, since the liquid crystal layer 30 uses a reverse mode polymer dispersed liquid crystal, the second transparent voltage VA2 is lower than the first transparent voltage VA1. Unlike the present embodiment, however, when the liquid crystal layer 30 uses a normal mode polymer dispersed liquid crystal, the second transparent voltage VA2 is higher than the first transparent voltage VA1.

One frame period of the period in which the images are displayed in the display area DA will be focused. The control unit CON applies a voltage between each of the plurality of pixel electrodes 11 and the common electrode 21 in the reset period, applies the transparent voltage (second transparent voltage VA2) to the plurality of liquid crystal areas 3, makes the display area DA transparent, and prohibits the light emission executed by the light source unit LU. The plurality of liquid crystal areas 3 including the first liquid crystal area 3A and the second liquid crystal area 3B becomes the second transparent state.

Based on the above, the control unit CON prohibits the light emission executed by the light source unit LU in periods other than the light emission period (i.e., the write period and the reset period). For this reason, the control unit CON sets a period independent of the light emission period to a capturing period. In the capturing period, the control unit CON prohibits the light emission executed by the light source unit LU, applies the transparent voltage (first transparent voltage VA1 or second transparent voltage VA2) to the plurality of liquid crystal areas 3, makes the display area DA transparent, makes the external light beam transmit in the plurality of liquid crystal areas 3, switches the modulation area MA of the modulating element MO to the transmissive state, and causes the camera CA to take in the external light beam transmitted through the display area DA and the modulation area MA of the modulating element MO.

The modulating element MO functions as a shutter. For this reason, the shutter of the camera CA itself may be set to an opened state (exposed state) at any time. Alternatively, when one frame period of the display device DSP is 1/60 second, the camera CA operating at 60 Hz can be used. Besides, when one frame period of the display device DSP is 1/50 second, the camera CA operating at 50 Hz can be used. Alternatively, when synchronizing the drive of the display panel PNL with the drive of the camera CA, the control unit CON may set the shutter of the camera CA itself to an opened state (exposed state) in periods other than the light emission period.

As a result, it is possible to avoid a situation in which the illumination light of the light source unit LU may be taken in the camera CA. The camera CA can capture the subject more clearly through the display panel PNL and the modulating element MO by setting the capturing period within the reset period.

Next, the gate driver GD of the present embodiment will be described. FIG. 17 is a circuit diagram showing parts of the gate driver GD and several gate lines G shown in FIG. 4 and the like.

As shown in FIG. 17, the gate driver GD comprises a sequential circuit SC, a control line WR, and a plurality of OR circuits OC. The sequential circuit SC includes a plurality of shift registers SR. The plurality of shift registers SR are connected in series.

The OR circuits OC are connected to the shift registers SR in a one-to-one relationship. The OR circuit OC includes a first input terminal TI1, a second input terminal TI2, and an output terminal TO. The first input terminal TI1 is connected to the corresponding shift register SR. The second input terminal 112 is connected to the control line WR. The output terminal TO is connected to one corresponding gate line G.

When a high-level first input signal IN1 is supplied from the shift register SR to the first input terminal TI1, the OR circuit OC outputs a first-level gate signal VG from the output terminal TO to the gate line G. When a high-level second input signal WAL is supplied from the control line WR to the second input terminal TI2, the OR circuit OC outputs the first-level gate signal VG from the output terminal TO to the gate line G. In addition, when a low-level first input signal IN1 and a low-level second input signal WAL are simultaneously supplied, the OR circuit OC outputs a second-level gate signal VG from the output terminal TO to the gate line G. For example, the first level is a high level, and the second level is a low level.

The control unit CON (for example, the timing controller TC) supplies the high-level second input signal WAL to the control line WR, and the gate driver GD thereby simultaneously outputs the first-level gate signal VG to all the gate lines G. As a result, all the switching elements SW can be turned on at once.

Alternatively, the control unit CON (for example, the timing controller TC) supplies the low-level second input signal WAL to the control line WR. The sequential circuit SC sequentially supplies the high-level first input signal IN1 to the first input terminals TI1 of all the OR circuits OC. The gate driver GD sequentially outputs the first-level gate signal VG to all the gate lines G, and turns on the switching element SW.

Unlike the present embodiment, however, the gate driver GD may not be configured to simultaneously output the first-level gate signal VG to all the gate lines G. For example, the gate driver GD may be configured to repeatedly execute the operation of simultaneously outputting the first-level gate signal VG to the plurality of gate lines G of the plurality of rows while changing a target to which the first-level gate signal VG is output.

Figure 18:
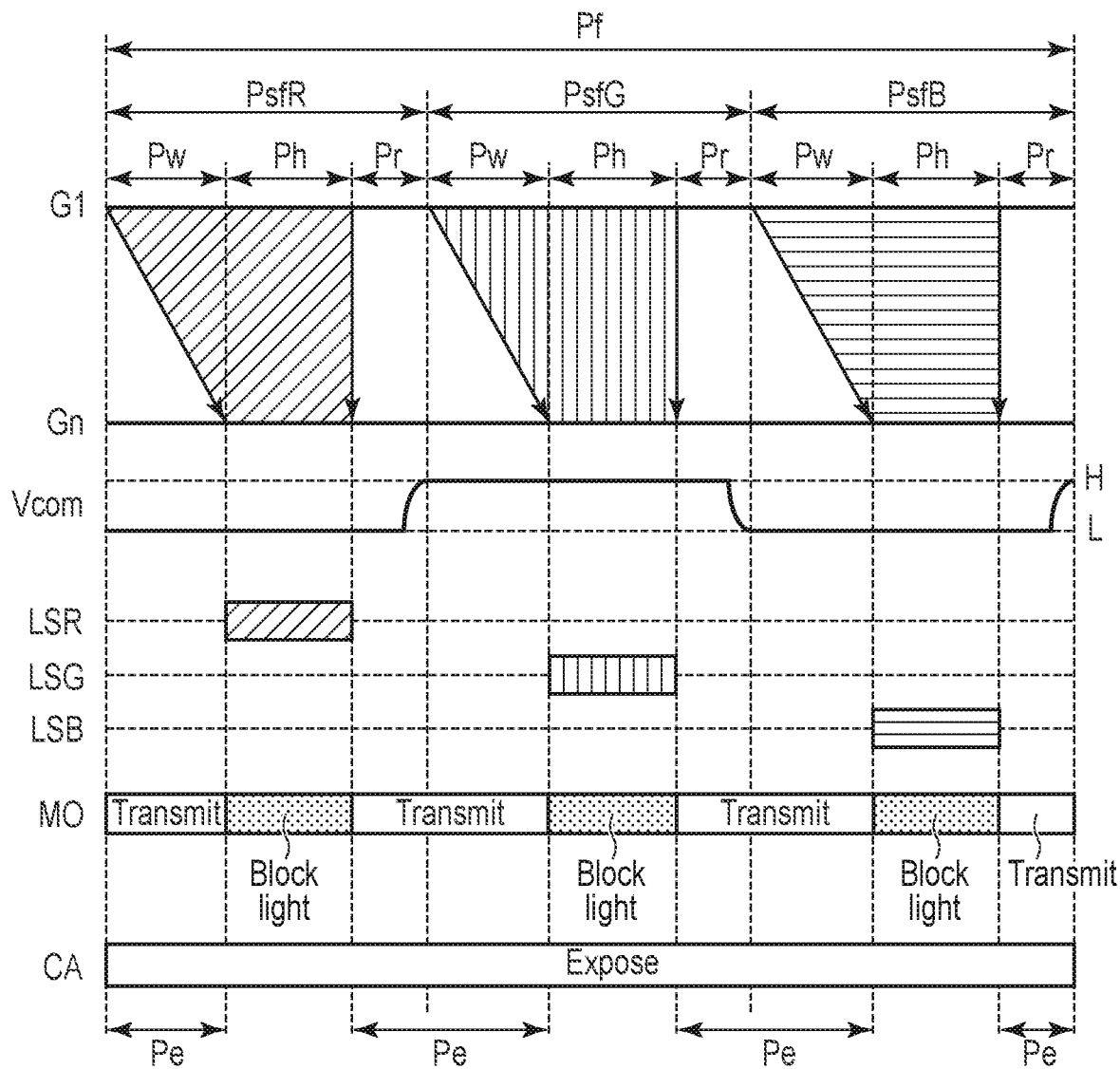
FIG. 18 is a timing chart for illustrating an example of an operation of the electronic device according to the first embodiment.

FIG. 18 is a timing chart for illustrating an example of an operation of the electronic device EA according to the first embodiment. As shown in FIG. 18, one frame period Pf corresponds to, for example, a period from the time when the vertical synchronization signal Vsync falls to the time when the vertical synchronization signal falls again. For example, when the display device DSP is driven at 60 Hz, one frame period Pf is approximately 16.7 ms.

One frame period Pf includes a first sub-frame period PsfR, a second sub-frame period PsfG, and a third sub-frame period PsfB, which are independent of each other. In this example, the first sub-frame period PsfR, the second sub-frame period PsfG, and the third sub-frame period PsfB are continued in this order. Unlike the present embodiment, however, the order of these sub-frame periods Psf may be changed. Each of the first sub-frame period PsfR, the second sub-frame period PsfG, and the third sub-frame period PsfB includes a write period Pw and a light emission period Ph subsequent to the write period Pw.

At least one sub-frame period Psf of the first sub-frame period PsfR, the second sub-frame period PsfG, and the third sub-frame period PsfB further includes a reset period Pr. In the present embodiment, each of the first sub-frame period PsfR, the second sub-frame period PsfG, and the third sub-frame period PsfB includes the reset period Pr. The reset period Pr is independent of the write period Pw and the light emission period Ph and is subsequent to the light emission period Ph. Unlike the present embodiment, however, the reset period Pr may precede the write period Pw.

In each sub-frame period Psf, the timing generation unit 50 executes display drive of each color by controlling the frame memory 51, the line memories 52R, 52G, and 52B, and the data conversion unit 53 by a data synchronization signal SS or using the detection unit 55 and the table 56.

In the write period Pw of the first sub-frame period PsfR, the gate driver GD sequentially supplies the high-level gate signal VG to each of the gate lines G1 to Gn. Furthermore, while the gate signal is supplied, the source driver SD supplies the source line voltage Vsig corresponding to red sub-frame data (R_DATA) stored in line memory 52R to each of the source lines S1 to Sm. More specifically, an operation of simultaneously supplying the source line voltage Vsig of the gradation corresponding to each pixel PX of the line to which the gate signal is supplied to each of the source lines S1 to Sm is repeated. The electric potential of the pixel electrode 11 is held by supplying the source line voltage Vsig to the pixel electrode 11 of the pixel PX corresponding to the selected gate line G via the switching element SW and then switching the switching element SW to a non-conductive state. After that, the gate line G of a subsequent row is selected and the same drive is sequentially executed. Incidentally, in this example, the polarity of the common voltage Vcom for driving the common electrode 21 is inverted in each sub-frame period Psf. More specifically, the polarity of the common voltage Vcom is inverted after the timing at which writing the second transparent voltage VA2 to all the pixels PX is ended, in the reset period Pr.

The voltage corresponding to the red sub-frame data is written between the pixel electrode 11 and the common electrode 21 of each of the pixels PX by this operation. In each sub-frame period Psf, the source line voltage Vsig supplied to each pixel electrode 11 via each of the source lines S1 to Sm has polarity different from that of the common voltage Vcom of the common electrode 21 or is the reference voltage Vsig-c. Accordingly, an absolute value of the voltage written to each of the pixels PX in the display area DA is 8V or more and 16V or less. Based on the above, the control unit CON selectively applies the scattering voltage VB and the first transparent voltage VA1 to the plurality of liquid crystal areas 3 in the write period Pw.

The light emission period Ph of the first sub-frame period PsfR is a period from the completion of writing to all the pixels PX to the arrival of the reset period Pr. In the light emission period Ph, the control unit CON holds a state in which the scattering voltage VB and the first transparent voltage VA1 are selectively applied to the plurality of liquid crystal areas 3, permits the light emitting element LSR to emit light of the first color, prohibits the light emitting element LSG to emit light of the second color, and prohibits the light emitting element LSB to emit light of the third color.

As a result, the control unit CON can scatter the light of the first color emitted by the light emitting element LSR in the plurality of liquid crystal areas 3 to which the scattering voltage VB is applied in the write period Pw of the first sub-frame period PsfR. Then, a red image is thereby displayed in the display area DA.

Incidentally, when the light emitting element LSR is turned on, the light emitting element is turned on without a margin period after the writing to all the pixels PX is completed. Unlike the present embodiment, however, the light emitting element LSR may be turned on with the margin period after the writing to all the pixels PX is completed. As a result, for example, a response period of the liquid crystal can be secured.

In the reset period Pr of the first sub-frame period PsfR, the transparent drive is executed under control of the timing controller TC. In other words, the gate driver GD simultaneously supplies the high-level gate signal VG to each of the gate lines G1 to Gn. For example, the transparent drive can be executed by supplying the high-level second input signal WAL to the control line WR. Furthermore, the source driver SD supplies, for example, the source line voltage Vsig having the same value as the common voltage Vcom to each of the source lines S1 to Sm while supplying the gate signal VG. By such an operation, the second transparent voltage VA2 is applied to the plurality of liquid crystal areas 3.

After the gate signal VG is supplied to the corresponding gate line G, the pixel electrode 11 of each pixel PX becomes in an electrically floating state until the gate signal VG is supplied to the gate line G next time. Therefore, in the pixel PX (liquid crystal area 3) to which the second transparent voltage VA2 is written, the second transparent voltage VA2 is held until a next gate signal VG is supplied to the corresponding gate line G.

In the pixel PX to which the second transparent voltage VA2 is written, the liquid crystal area 3 is in a good second transparent state. In the reset period Pr, all of the light emitting elements LSR, LSG, and LSB are turned off. Incidentally, the light-emitting elements LSR, LSG, and LSB are desirably turned off in the reset period Pr but may be turned on in the reset period Pr.

The source line voltage Vsig supplied to each of the source lines S1 to Sm in the reset period Pr does not need to be the same as the common voltage Vcom as long as the voltage written to each pixel PX is a value which becomes the second transparent voltage VA2. Various aspects described with reference to FIG. 10 and FIG. 11 can be applied to the common voltage Vcom and the source line voltage Vsig in the transparent drive.

By securing a period for collectively supplying the high-level gate signal VG to all the gate lines G1 to Gn in the reset period Pr, for a certain period, the electric potential of the pixel electrode 11 and the electric potential of the common electrode 21 can be caused to transition to desired values. In addition, in the example illustrated, the reset period Pr includes a holding period for holding the second transparent voltage VA2 after the second transparent voltage VA2 is applied to all the liquid crystal areas 3. Unlike the present embodiment, however, the reset period Pr may be a period in which the second transparent voltage VA2 is applied to all the liquid crystal areas 3, and the reset period Pr may not include the above holding period.

The operation in the second sub-frame period PsfG and the third sub-frame period PsfB is the same as that in the first sub-frame period PsfR. In other words, the second sub-frame period PsfG includes the write period Pw, the light emission period Ph, and the reset period Pr, and a voltage corresponding to green sub-frame data (G DATA) stored in the line memory 52G is written to the pixel PX of the display area DA, in the write period Pw.

In the light emission period Ph of the second sub-frame period PsfG, the control unit CON holds a state in which the scattering voltage VB and the first transparent voltage VA1 are selectively applied to the plurality of liquid crystal areas 3, permits the light emitting element LSG to emit light of the second color, prohibits the light emitting element LSR to emit light of the first color, and prohibits the light emitting element LSB to emit light of the third color.

As a result, the control unit CON can scatter the light of the second color emitted by the light emitting element LSG in the plurality of liquid crystal areas 3 to which the scattering voltage VB is applied in the write period Pw of the second sub-frame period PsfG. Then, a green image is thereby displayed in the display area DA.

In addition, the third sub-frame period PsfB includes the write period Pw, the light emission period Ph, and the reset period Pr, and a voltage corresponding to blue sub-frame data (B DATA) stored in the line memory 52B is written to the pixel PX of the display area DA, in the write period Pw.

In the light emission period Ph of the third sub-frame period PsfB, the control unit CON holds a state where the scattering voltage VB and the first transparent voltage VA1 are selectively applied to the plurality of liquid crystal areas 3, permits the light emitting element LSB to emit light of the third color, prohibits the light emitting element LSR to emit light of the first color, and prohibits the light emitting element LSG to emit light of the second color.

As a result, the control unit CON can scatter the light of the third color emitted by the light emitting element LSB in the plurality of liquid crystal areas 3 to which the scattering voltage VB is applied in the write period Pw of the third sub-frame period PsfB. Then, a blue image is thereby displayed in the display area DA.

In a certain frame period Pf, image data displayed in the subsequent frame period Pf are written to the frame memory 51. Furthermore, the sub-frame data of the line memory 52R, 52G, and 52B whose writing to the pixel PX is completed are rewritten to the sub-frame data corresponding to the image data written in the frame memory 51.

The multi-color display image is visually recognized for the user by mixing red, green, and blue images displayed in time division in the first sub-frame period PsfR, the second sub-frame period PsfG, and the third sub-frame period PsfB.

The control unit CON switches the modulating element MO to the transmissive state in a plurality of write periods Pw and a plurality of reset periods Pr, and switches the modulating element MO to the light-shielding state in a plurality of light emission periods Ph.

The control unit CON can set the capturing period Pe to be in the write period Pw and the reset period Pr. In the present embodiment, the control unit CON sets the capturing period Pe to be within the plurality of write periods Pw and the plurality of reset periods Pr of one frame period Pf. More specifically, the control unit CON sets the capturing periods Pe in all the write periods Pw and all the reset periods Pr of one frame period Pf.

Since the subject can be captured by the camera CA in both the write period Pw and the reset period Pr, a situation in which the amount of exposed light may be degraded can be avoided. In addition, since the capturing period Pe can be set in the reset period Pr, the subject can be captured by the camera CA in a state in which the transparency of the display area DA is the highest. For example, the subject can be captured more clearly through the display panel PNL and the modulating element MO by the camera CA.

In addition, in the reset period Pr, the second transparent voltage VA2 is applied to each of the liquid crystal areas 3. A period in which the transparency of the display area DA increases can be increased by setting such a reset period Pr once in each sub-frame period Psf. Incidentally, the reset period Pr may be provided once in each frame period Pf or may be provided once in a plurality of frame periods. From a viewpoint of suppressing display failures such as burning of an image, a frequency of resetting is preferably high.

When the reset period Pr is adjusted, not only the period until the potential of the pixel electrode 11 and the potential of the common electrode 21 transition to desired values as described above, but also the transparency of the display area DA may be considered.

As the rate of the reset period Pr to the frame period Pf becomes larger, the transparency of the display area DA is increased but the image visibility may be reduced. The length of the reset period Pr is desirably determined by considering these matters.

For example, the first sub-frame period PsfR, the second sub-frame period PsfG, and the third sub-frame period PsfB can be set to have the same length. The color chromaticity of the display image may be adjusted by making the proportion of the first sub-frame period PsfR, the second sub-frame period PsfG, and the third sub-frame period PsfB different.

The scattering voltage VB and the first transparent voltage VA1 in consideration of the polarity inversion drive scheme will be described here.

As shown in FIG. 7, FIG. 8A, FIG. 8B, and FIG. 8C, the scattering voltage VB has a positive-polarity scattering voltage and a negative-polarity scattering voltage. The positive-polarity scattering voltage is, for example, 8V to 16V, and the negative-polarity scattering voltage is, for example, −16V to −8V.

Absolute values of the positive-polarity first transparent voltage VA1 and the negative-polarity first transparent voltage VA1 are a half of a maximum value of the positive-polarity scattering voltage VB and a half of a maximum value of the absolute value of the negative-polarity scattering voltage VB, respectively. For example, in the example shown in FIG. 9, each of the absolute values of the positive-polarity first transparent voltage VA1 and the negative-polarity first transparent voltage VA1 is 8V, and each of the maximum value of the positive-polarity scattering voltage VB and the maximum value of the absolute value of the negative-polarity scattering voltage VB is 16V. For example, even if the first transparent voltage VA1 and the scattering voltage VB have any polarity, the absolute value of the first transparent voltage VA1 is half the maximum value of the absolute value of the scattering voltage VB. However, the present invention is not limited to the above example, but the positive-polarity and negative-polarity first transparent voltages VA1 may be voltages whose degree of scattering is in a range of 50% or less.

According to the electronic device EA according to the first embodiment constituted as described above, the electronic device EA comprises the display panel PNL including the display area DA where images are displayed and external light beam is transmitted, the light source unit LU located outside the area opposed to the display area DA of the display panel PNL, the camera CA opposed to the display area DA of the display panel PNL, the modulating element MO, and the control unit CON which controls the display panel PNL, the light source unit LU, and the modulating element MO. The modulating element MO is located between the display area DA of the display panel PNL and the camera CA. The modulating element MO is switched to a transmissive state of transmitting light traveling from the display area DA toward the camera CA or a light-shielding state of blocking light traveling from the display area DA toward the camera CA.

In the light emission period Ph, the control unit CON permits the light source unit LU to emit light, emits light to the display area DA, displays images in the display area DA, and switches the modulating element MO to the light-shielding state. In the capturing period Pe independent of the light emission period Ph, the control unit CON prohibits the light source unit LU to emit light, sets the display area DA to be transparent, switches the modulating element MO to the transmissive state, and urges the external light beam transmitted through the display area DA and the modulating element MO to be taken in the camera CA.

As a result, the electronic device EA capable of capturing the subject through the screen and displaying the image on the screen can be obtained. For example, the user can naturally direct the own line of sight toward the camera while making eye contact with the partner displayed on the screen.

The gate driver GD can output the high-level (on-level) gate signal VG to all the gate lines G in the reset period Pr at once. For this reason, the period of the reset period Pr can be reduced as compared with the case of sequentially scanning the gate lines G in the reset period Pr.

In addition, according to the configuration of the present embodiment, the display device DSP can be driven by the source driver SD of a low withstand voltage. This advantage will be described with reference to FIG. 7 and FIG. 9.

A comparative example in which the common voltage Vcom is a DC voltage and the only polarity of the source line voltage Vsig is inversed about the common voltage Vcom is assumed. In this case, a voltage of 0V (second transparent voltage VA2) can be applied to each liquid crystal area 3 even in normal display drive, by setting the source line voltage Vsig to the same voltage as the common voltage Vcom. In this comparative example, however, the source line voltage Vsig needs be variable within a range between −16V and +16V to the common voltage Vcom to use the scattering voltage shown in FIG. 7 for the gradation expression. In other words, the circuit such as the source driver SD needs to have the withstand voltage of 32V.

In contrast, according to the constitution of the present embodiment, the source line voltage Vsig and the common voltage Vcom may be variable within a range of, for example, 16V as shown in FIG. 9. In other words, the circuit such as the source driver SD needs only to have the withstand voltage of 16V. Thus, the circuit size and the manufacturing costs can be reduced by suppressing the withstand voltage of the circuit.

In addition to the above, various suitable advantages can be obtained from the present embodiment.

Modified Example of First Embodiment

Figure 19:
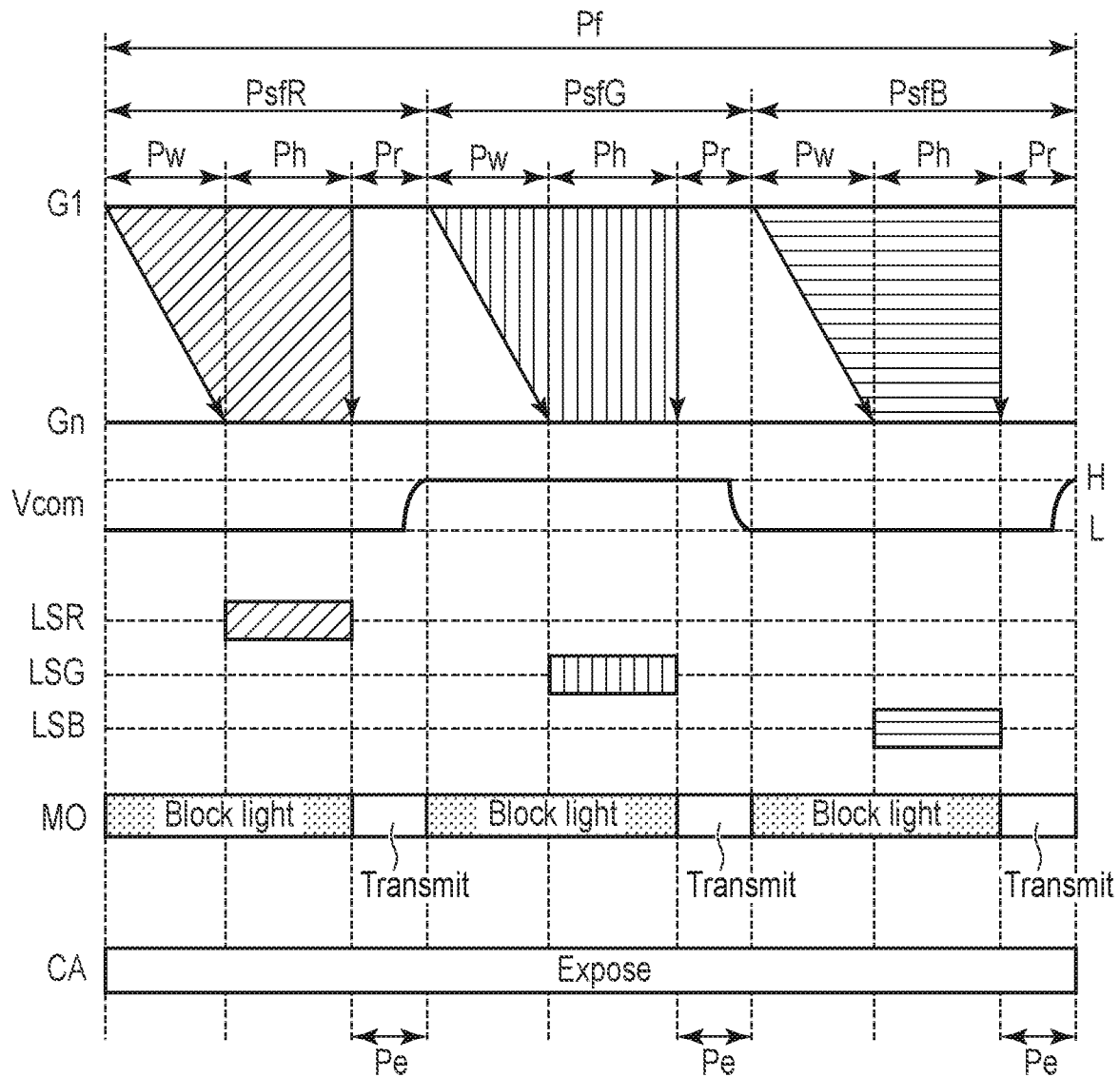
FIG. 19 is a timing chart for illustrating another example of the operation of the electronic device according to the first embodiment.

Next, a modified example of the above first embodiment will be described. An electronic device EA of the present modified example is configured similarly to the electronic device EA of the above first embodiment. FIG. 19 is a timing chart for illustrating another example of the operation of the electronic device EA according to the above first embodiment.

As shown in FIG. 19, the control unit CON may set the capturing period Pe to the only reset period Pr. In the modified example, the control unit CON sets the capturing period Pe to all the reset periods Pr in one frame period Pf. The control unit CON switches the modulating element MO to the light-shielding state in the write period Pw and the light emission period Ph, and switches the modulating element MO to the transmissive state in the reset period Pr.

In the modified example, too, the same advantages as the above-described first embodiment can also be obtained. The camera CA does not take in the external light beam transmitted through the liquid crystal area 3 to which the scattering voltage VB is applied, and the external light beam transmitted through the liquid crystal area 3 to which the first transparent voltage VA1 is applied. For this reason, the subject can be captured more clearly through the display panel PNL by the camera CA as compared with the above first embodiment.

Incidentally, in the modified example, the frequencies of the reset period Pr and the capturing period Pe can also be variously modified. For example, the control unit CON may set the capturing period Pe to only one reset period Pr in one frame period Pf or may set the capturing period Pe to only two reset periods Pr in one frame period Pf.

Second Embodiment

Next, a second embodiment will be described. An electronic device EA is configured similarly to the electronic device EA of the above first embodiment except for a configuration to be described in the second embodiment. FIG. 20 is an exploded perspective view showing a part of the electronic device EA according to the second embodiment, illustrating alignment films 12 and 22, a liquid crystal layer 30, a modulating element MO, and a camera CA.

As shown in FIG. 20, rubbing is applied to an alignment film (rubbing alignment film) 12 in a first treatment direction AL1, and rubbing is applied to an alignment film (rubbing alignment film) 22 in a second treatment direction AL2. In the present embodiment, the first treatment direction AL1 is a direction which is opposite to the first direction X, and the second treatment direction AL2 is a direction which is the same as the first direction X. Since initial alignment directions of the plurality of liquid crystalline molecules 32 can be aligned in the same direction, the transmittance can be increased.

However, the first treatment direction AL1 and the second treatment direction AL2 may be the same directions. In addition, each of the alignment films 12 and 22 may be subjected to not rubbing, but a photo-alignment treatment. In this case, a direction in which the alignment film (photo-alignment film) 12 is subjected to the alignment treatment by a photo-alignment method and a direction in which the alignment film (photo-alignment film) 22 is subjected to the alignment treatment by a photo-alignment method may be parallel to the first direction X. Alternatively, one of the alignment film 12 and the alignment film 22 may be a photo-alignment film, and the other may be a rubbing alignment film.

Figure 21A:
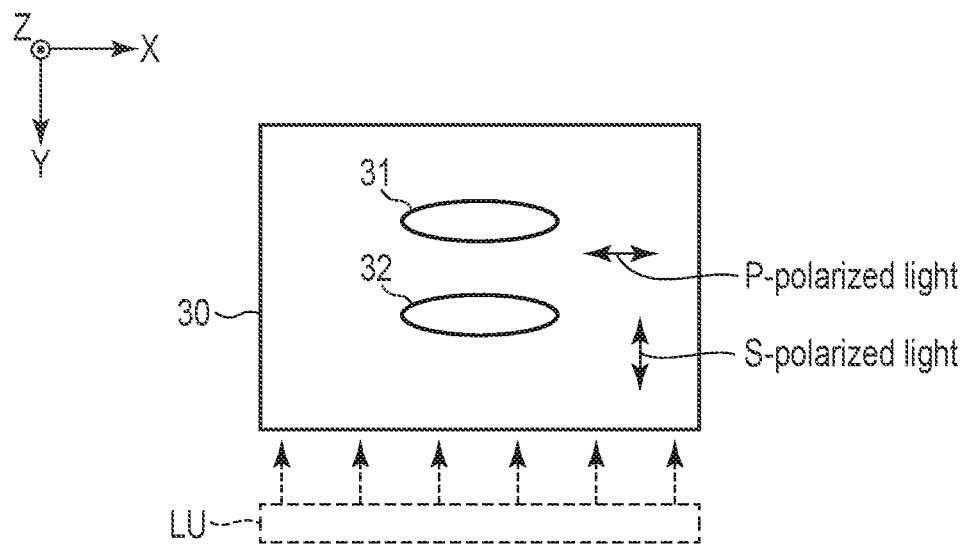
FIG. 21A is a diagram schematically showing a display liquid crystal layer and a light source unit in the transparent state.
Figure 21B:
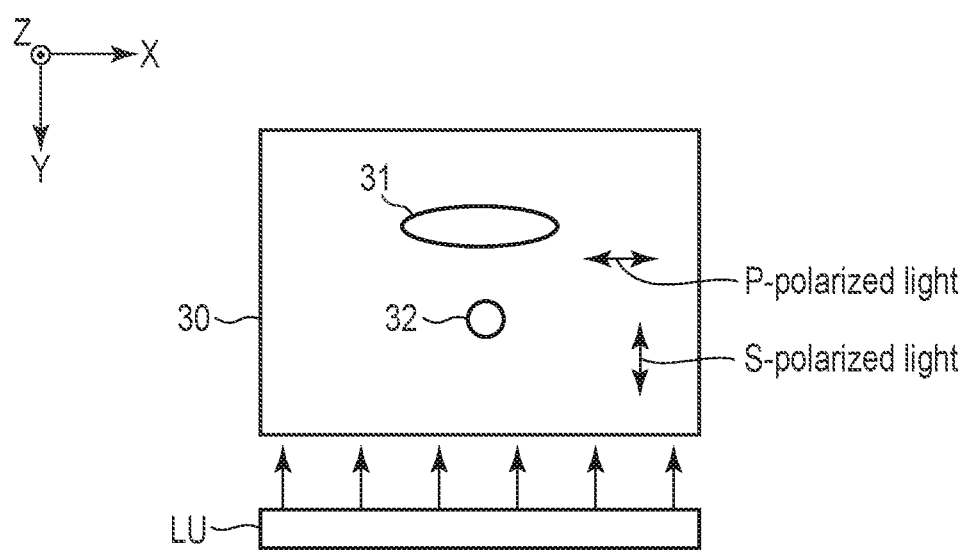
FIG. 21B is a diagram schematically showing the display liquid crystal layer and the light source unit in the scattered state.

FIG. 21A is a diagram schematically showing a liquid crystal layer 30 in a transparent state and a light source unit LU. FIG. 21B is a diagram schematically showing a liquid crystal layer 30 in a scattered state and a light source unit LU.

As shown in FIG. 21A, the liquid crystal layer 30 in the transparent state is in a state in which the second transparent voltage VA2 is applied to the liquid crystal layer 30. In planar view, a long axis of the liquid crystalline polymer 31 and a long axis of the liquid crystalline molecule 32 are parallel to the first direction X. For the plurality of liquid crystalline molecules 32, a director of each liquid crystal area 3 to which the transparent voltage (second transparent voltage VA2) is applied is parallel to the first direction X in planar view.

There is almost no refractive index difference between the liquid crystalline polymer 31 and the liquid crystalline molecules 32. The liquid crystal layer 30 in the transparent state can transmit the external light beam while hardly scattering the external light beam. Even if the illumination light of the light source unit LU is made incident on the liquid crystal layer 30 to which the second transparent voltage VA2 is applied, the liquid crystal layer 30 transmits the illumination light while hardly scattering the illumination light.

As shown in FIG. 21B, the liquid crystal layer 30 in the scattered state is in a state in which the scattering voltage VB is applied to the liquid crystal layer 30. There is a large refractive index difference between the liquid crystalline polymer 31 and the liquid crystalline molecule 32. The light to be made incident on the liquid crystal layer 30 in the scattered state has different parallelisms (degrees of scattering) in accordance with the polarization state as will be described later.

In addition, even if the illumination light of the light source unit LU is made incident on the liquid crystal layer 30 to which the scattering voltage VB is applied, the liquid crystal layer 30 scatters the illumination light. A direction in which the light source unit LU emits light to the display area DA of the display panel PNL is desirably orthogonal to the first treatment direction AL1 and the second treatment direction AL2, in planar view. In other words, a direction in which the light source unit LU emits light to the display area DA of the display panel PNL is desirably orthogonal to a director of each liquid crystal area 3 to which the transparent voltage (second transparent voltage VA2) is applied, in planar view. As a result, the light emitted from the light source unit LU can be efficiently extracted to the outside of the display panel PNL.

Figure 22:
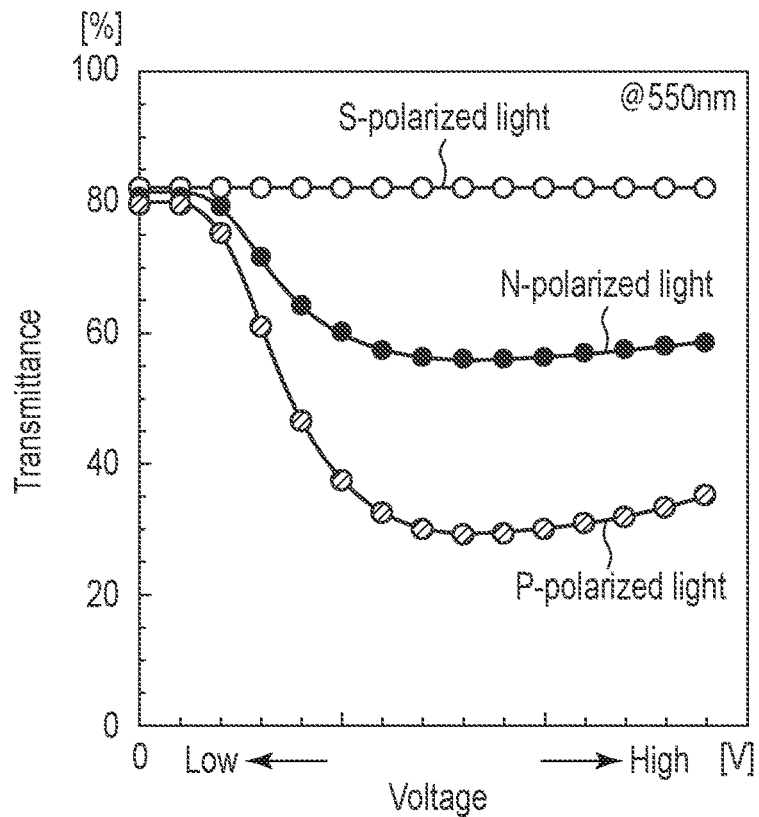
FIG. 22 is a graph showing change in transmittance to voltage in S-polarized light, P-polarized light, and N-polarized light.

FIG. 22 is a graph showing change in transmittance to voltage in S-polarized light, P-polarized light, and N-polarized light. As shown in FIG. 22, it can be understood that light in a certain polarized state (S-polarized light) can be transmitted through the display panel PNL (liquid crystal layer 30) regardless of a value of the voltage to be applied to the liquid crystal layer 30. In other words, even if the scattering voltage VB is applied, the first transparent voltage VA1 is applied, or the second transparent voltage VA2 is applied to the liquid crystal layer 30, there is almost no change in the parallelism (degree of scattering) of the S-polarized light transmitted through the liquid crystal layer 30.

The same advantages as those of the above-described first embodiment can also be obtained from the second embodiment configured as described above.

Third Embodiment

Figure 23:
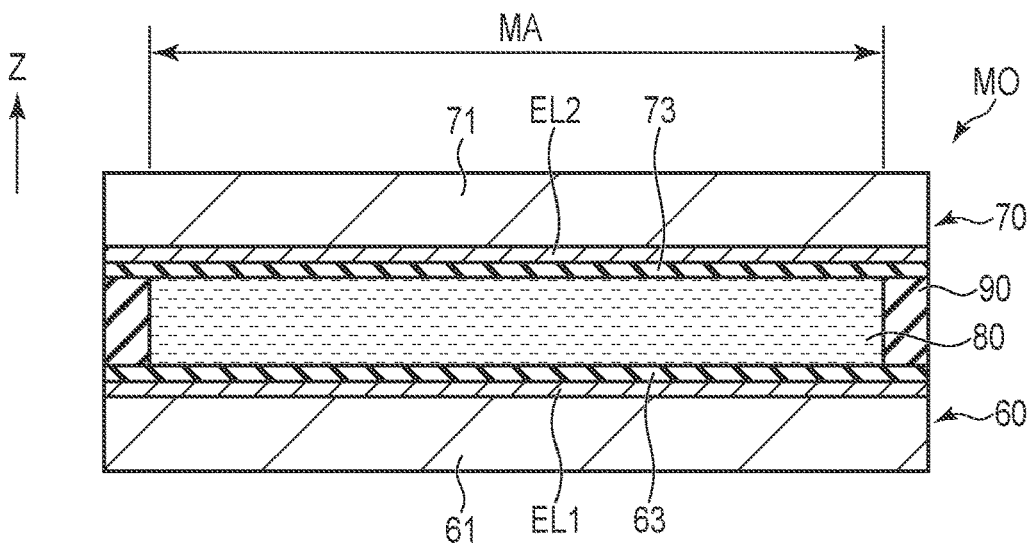
FIG. 23 is a cross-sectional view showing a modulating element of an electronic device according to a third embodiment.

Next, a third embodiment will be described. An electronic device EA is configured similarly to the electronic device EA of the first embodiment except for a configuration to be described in the third embodiment. FIG. 23 is a cross-sectional view showing a modulating element MO of the electronic device EA according to the third embodiment.

As shown in FIG. 23, the modulating element MO comprises a first substrate (first control substrate) 60, a second substrate (second control substrate) 70, a liquid crystal layer (control liquid crystal layer) 80, and the like.

The first substrate 60 comprises a transparent substrate 61, a first control electrode EL1, an alignment film (first control alignment film) 63, and the like. The second substrate 70 comprises a transparent substrate 71, a second control electrode EL2, an alignment film (second control alignment film) 73, and the like. The first control electrode EL1 and the second control electrode EL2 are formed of, for example, a transparent conductive material such as ITO or IZO, and are located in a modulation area MA.

In the present embodiment, the first substrate 60 includes the single first control electrode EL1, but may include a plurality of electrically independent first control electrodes EL1. Each of the alignment film 63 and the alignment film 73 is in contact with the liquid crystal layer 80.

The liquid crystal layer 80 is located in at least the modulation area MA. The liquid crystal layer 80 contains a polymer dispersed liquid crystal, and is held between the first substrate 60 and the second substrate 70. The liquid crystal layer 80 of the present embodiment uses reverse mode polymer dispersed liquid crystal (R-PDLC). Unlike the present embodiment, the liquid crystal layer 80 may use normal mode polymer dispersed liquid crystal.

The first substrate 60 and the second substrate 70 are bonded by a sealing material 90. The liquid crystal layer 80 is formed in a space surrounded by the first substrate 60, the second substrate 70, and the sealing material 90.

Figure 24:
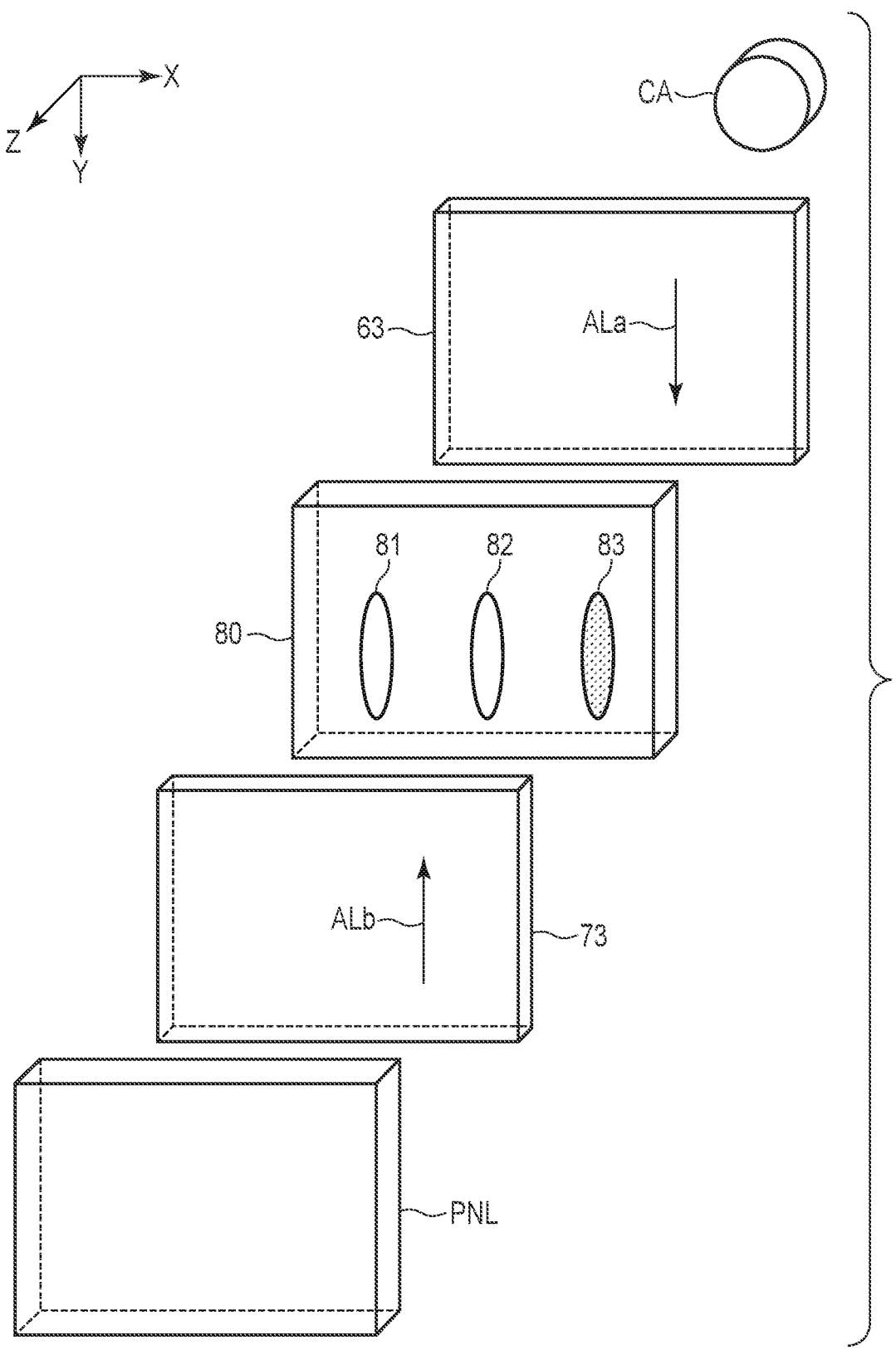
FIG. 24 is an exploded perspective view showing parts of the electronic device according to the third embodiment, illustrating a display panel, a control alignment film, a control liquid crystal layer, and a camera.

FIG. 24 is an exploded perspective view showing a part of the electronic device EA according to the third embodiment, illustrating a display panel PNL, the alignment films 63 and 73, the liquid crystal layer 80, and a camera CA.

As shown in FIG. 24, the liquid crystal layer 80 includes liquid crystalline polymers 81, liquid crystalline molecules 82, and dichroic dye molecules 83. For this reason, dichroic dye is contained in the liquid crystal layer 80. The dichroic dye is, for example, black dye. For this reason, the control unit CON can switch the modulating element MO (liquid crystal layer 80) to a transmissive state or a light-shielding state.

Each of the alignment film 63 and the alignment film 73 is a horizontal alignment film. The alignment film (rubbing alignment film) 63 is subjected to rubbing in a third treatment direction ALa, and the alignment film (rubbing alignment film) 73 is subjected to rubbing in a fourth treatment direction ALb. In the present embodiment, the third treatment direction ALa is the same direction as the second direction Y, and the fourth treatment direction ALb is a direction opposite to the second direction Y.

However, the third treatment direction ALa and the fourth treatment direction ALb may be the same directions. Alternatively, each of the alignment films 63 and 73 may be subjected to not rubbing, but photo-alignment treatment. In this case, a direction in which the alignment film (photo-alignment film) 63 is subjected to the alignment treatment by a photo-alignment method and a direction in which the alignment film (photo-alignment film) 73 is subjected to the alignment treatment by a photo-alignment method may be parallel to the second direction Y. Alternatively, one of the alignment film 63 and the alignment film 73 may be a photo-alignment film, and the other may be a rubbing alignment film.

The liquid crystalline molecule 82 is a positive liquid crystalline molecule having positive dielectric anisotropy.

Unlike the present embodiment, however, the alignment films 63 and 73 may be vertical alignment films that subject the liquid crystalline polymer 81, the liquid crystalline molecule 82, and the dichroic dye molecule 83 to initial alignment along the third direction Z. Alternatively, the liquid crystalline molecule 82 may be a negative liquid crystalline molecule having negative dielectric anisotropy.

Figure 25A:
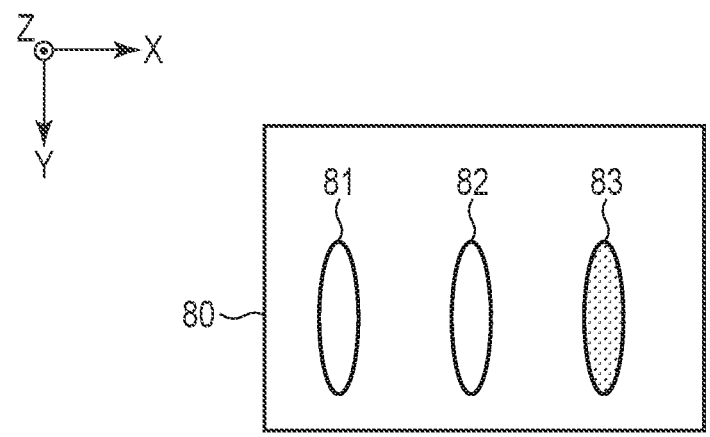
FIG. 25A is a diagram schematically showing a control liquid crystal layer in a state in which the modulating element of the electronic device according to the third embodiment is switched to a light-shielding state.
Figure 25B:
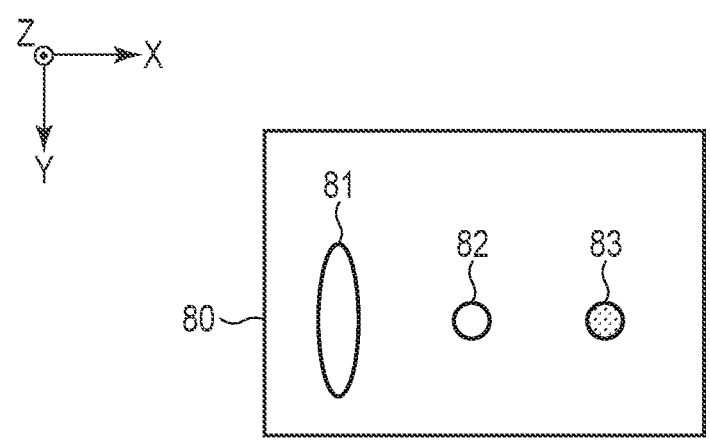
FIG. 25B is a diagram schematically showing a control liquid crystal layer in a state in which the modulating element of the electronic device according to the third embodiment is switched to a transmissive state.

FIG. 25A is a diagram schematically showing the liquid crystal layer 80 in a state in which the modulating element MO of the electronic device EA according to the third embodiment is switched to a light-shielding state. FIG. 25B is a diagram schematically showing the liquid crystal layer 80 in a state in which the modulating element MO of the electronic device EA according to the third embodiment is switched to a transmissive state.

As shown in FIG. 25A, the liquid crystal layer 80 in the light-shielding state is considered to be in a state in which no voltage is applied to the liquid crystal layer 80 (0V). In planar view, a long axis of the liquid crystalline polymer 81, a long axis of the liquid crystalline molecule 82, and a long axis of the dichroic dye molecule 83 are parallel to the second direction Y. When the modulating element MO is switched to the light-shielding state, a control director which is a director of the liquid crystal layer 80 intersects the traveling direction of the light which travels from the display panel PNL to the camera CA (i.e., a direction opposite to the third direction Z). For example, the control director is orthogonal to the traveling direction of the light (i.e., a direction opposite to the third direction Z). When a potential difference between the first control electrode EL1 and the second control electrode EL2 is 0V, the alignment film 63 and the alignment film 73 urge the alignment restriction force to act on the liquid crystalline molecule 82 such that the control director is perpendicular to the direction (third direction Z) in which the alignment film 63 faces the alignment film 73. Since the light traveling from the display area DA to the camera CA can be absorbed into the dichroic dye molecule 83, the modulating element MO becomes the light-shielding state.

As shown in FIG. 25B, the liquid crystal layer 80 in the transmissive state is considered to be in a state in which a voltage (for example, a voltage exceeding 8V) is applied to the liquid crystal layer 80. In planar view, the long axis of the liquid crystalline polymer 81 remains parallel to the second direction Y. The electric field which occurs between the first control electrode EL1 and the second control electrode EL2 acts on the liquid crystalline molecule 82, and the long axis of the liquid crystalline molecule 82 thereby becomes parallel to the third direction Z. Since the dichroic dye molecule 83 is aligned in accordance with the liquid crystalline molecule 82, the long axis of the dichroic dye molecule 83 becomes parallel to the third direction Z.

When the modulating element MO is switched to the transmissive state, the director (control director) of the liquid crystal layer 80 is parallel to the traveling direction of the light which travels from the display panel PNL to the camera CA (i.e., the direction opposite to the third direction Z). The traveling direction of the light is parallel to the long axis of the dichroic dye molecule 83. Since absorption of the light traveling from the display area DA to the camera CA does not occur in the liquid crystal layer 80 shown in FIG. 25B, the modulating element MO becomes the transmissive state. The camera CA can take in the external light beam transmitted through the display panel PNL in the transparent state and the modulating element MO in the transmissive state (i.e., the modulation area MA).

The same advantages as those of the above-described first embodiment can also be obtained from the third embodiment configured as described above. The modulating element MO which can be switched to the transmissive state or the light-shielding state can be obtained by using the reverse mode polymer dispersed liquid crystal containing dye as the liquid crystal layer 80 and constituting the alignment films 63 and 73 with the horizontal alignment films.

Fourth Embodiment

Figure 26:
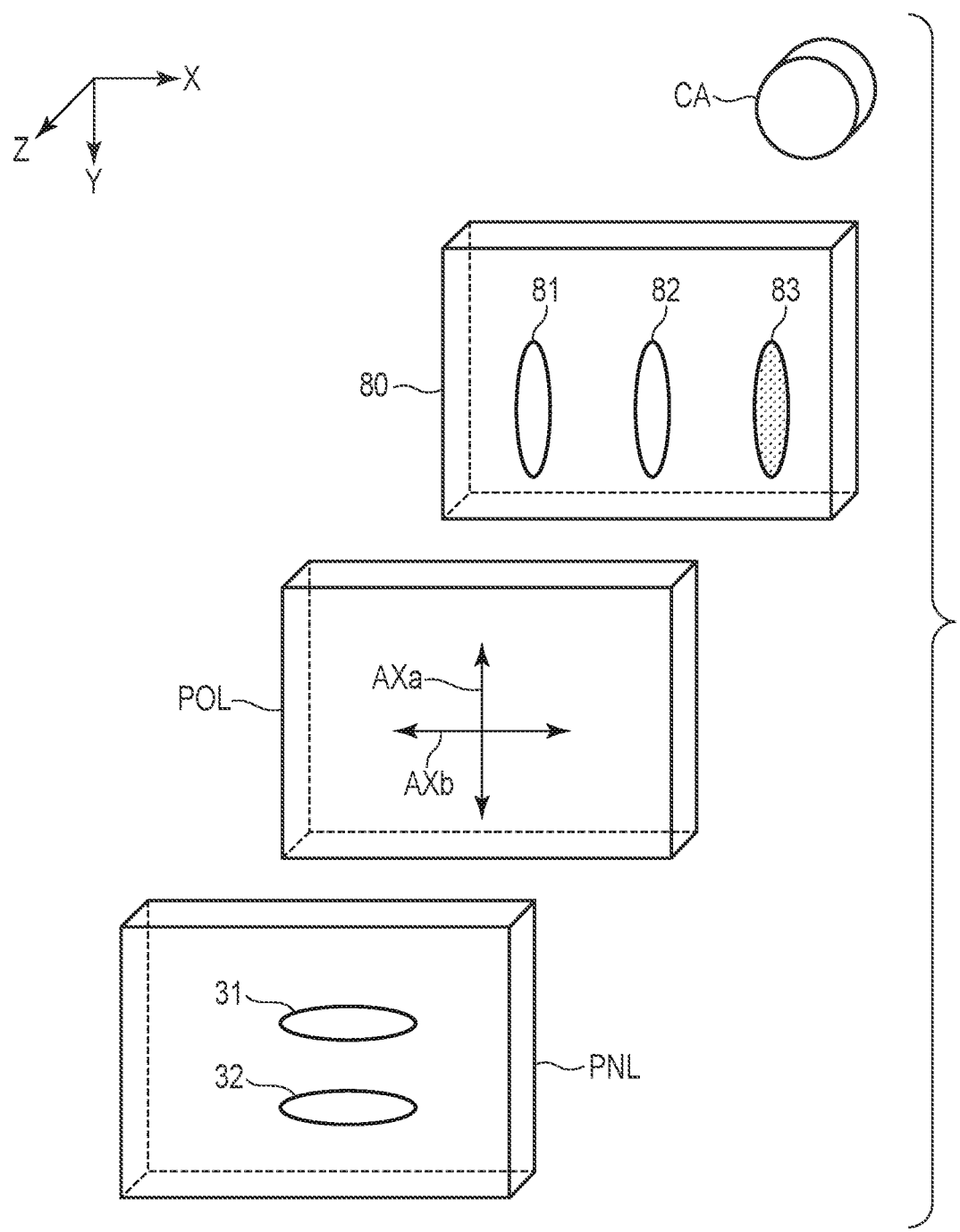
FIG. 26 is an exploded perspective view showing parts of the electronic device according to a fourth embodiment, illustrating a display panel, a polarizing element, a control liquid crystal layer, and a camera.

Next, a fourth embodiment will be described. An electronic device EA is configured similarly to the electronic device EA of the above third embodiment except for a configuration to be described in the fourth embodiment. FIG. 26 is an exploded perspective view showing a part of the electronic device EA according to the fourth embodiment, illustrating a display panel PNL, a polarizing element POL, a liquid crystal layer 80 of a modulating element MO, and a camera CA.

As shown in FIG. 26, the electronic device EA may further comprise the polarizing element POL. The polarizing element POL is located between the display area DA of the display panel PNL and a modulation area MA of the modulating element MO. The polarizing element POL has an easy transmission axis AXa and an absorption axis AXb which are orthogonal to each other. In the present embodiment, the easy transmission axis AXa is parallel to the second direction Y, and the absorption axis AXb is parallel to the first direction X. The polarizing element POL is, for example, a polarizer.

The absorption axis AXb of the polarizing element POL is parallel to a display director, i.e., a director of each liquid crystal area 3 to which a transparent voltage (second transparent voltage VA2) is applied, in planar view. For this reason, the polarizing element POL can supply an only component of S-polarized light of the external light beam transmitted through the display panel PNL to the modulating element MO (liquid crystal layer 80) and can make the camera CA take in the component. As a result, the camera CA can capture the subject under the same conditions, in the write period Pw and the reset period Pr. The camera CA does not take in a P-polarized light component of the external light beam. For this reason, degradation of image quality such as distortion can be made difficult to occur in the image captured by the camera CA.

The polarizing element POL is desirably located between the display panel PNL and the modulating element MO, similarly to the present embodiment. This is because scattering can hardly occur in the liquid crystal layer 80 since components of the external light beam other than the S-polarized light component cannot enter the liquid crystal layer 80. Unlike the present embodiment, however, the polarizing element POL may be located between the modulating element MO and the camera CA.

The same advantages as those of the above-described third embodiment can also be obtained from the fourth embodiment configured as described above. Even if only the S-polarized light of the external light beam transmitted through the display panel PNL is supplied to the modulating element MO and taken in the camera CA, the subject can be captured by the camera CA in both the write period Pw and the reset period Pr, and a situation in which the amount of exposed light may degrade can be thereby avoided.

In addition, as shown in FIG. 22, since the S-polarized light of the external light beam can be transmitted through the liquid crystal layer 30 regardless of the value of the voltage applied to the liquid crystal layer 30, the camera CA can capture the subject more clearly through the display panel PNL.

When the electronic device EA of the fourth embodiment is used, it is suitable for the operation of the electronic device EA of setting the capturing period Pe to the write period Pw. For example, the electronic device EA of the fourth embodiment desirably executes the above-described operation shown in FIG. 18. However, the electronic device EA of the fourth embodiment may execute the above-described operation shown in FIG. 19.

Fifth Embodiment

Figure 27A:
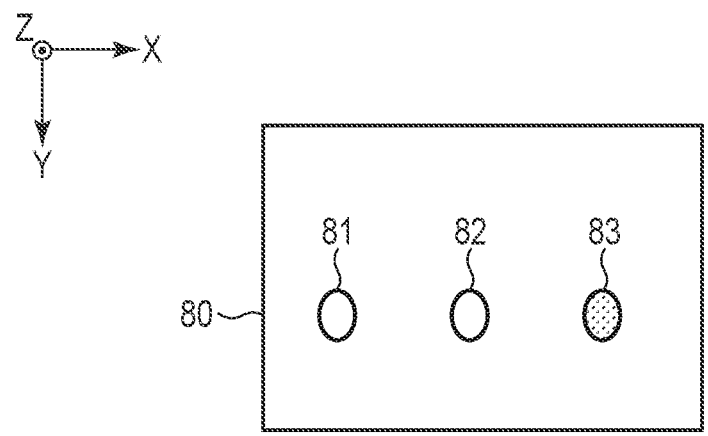
FIG. 27A is a diagram schematically showing a control liquid crystal layer in a state in which a modulating element of the electronic device according to the fifth embodiment is switched to a transmissive state.
Figure 27B:
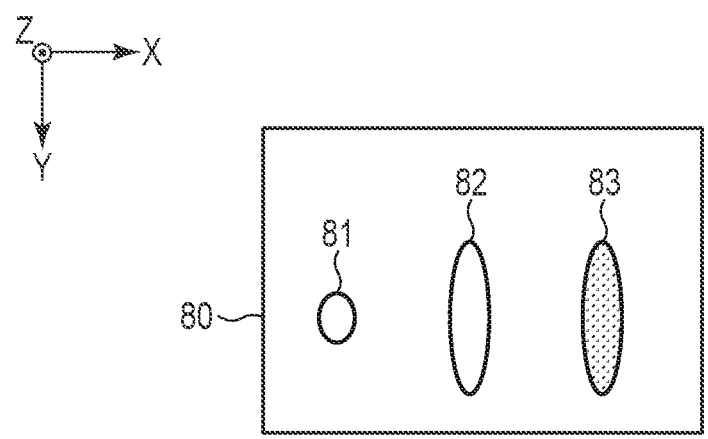
FIG. 27B is a diagram schematically showing a control liquid crystal layer in a state in which the modulating element of the electronic device according to the fifth embodiment is switched to a light-shielding state.

Next, a fifth embodiment will be described. An electronic device EA is configured similarly to the electronic device EA of the above third embodiment except for a configuration to be described in the fifth embodiment. FIG. 27A is a diagram schematically showing the liquid crystal layer 80 in a state in which the modulating element MO of the electronic device EA according to the fifth embodiment is switched to a transmissive state. FIG. 27B is a diagram schematically showing the liquid crystal layer 80 in a state in which the modulating element MO of the electronic device EA according to the fifth embodiment is switched to a light-shielding state.

As shown in FIG. 27A, the liquid crystal layer 80 in the transmissive state is considered to be in a state in which no voltage is applied to the liquid crystal layer 80 (0V). Each of an alignment film 63 and an alignment film 73 is a vertical alignment film. Each of the alignment film 63 and the alignment film 73 is subjected to rubbing in a direction parallel to the second direction Y. The liquid crystalline molecule 82 is a negative liquid crystalline molecule having negative dielectric anisotropy.

When a potential difference between the first control electrode EL1 and the second control electrode EL2 is 0V, the alignment film 63 and the alignment film 73 urge the alignment restriction force to act on the liquid crystalline molecule 82 such that the control director is tilted from the direction (third direction Z) in which the alignment film 63 faces the alignment film 73. In planar view, a long axis of the liquid crystalline polymer 81, a long axis of the liquid crystalline molecule 82, and a long axis of the dichroic dye molecule 83 are tilted from the third direction Z.

When the modulating element MO is switched to the transmissive state, the control director of the liquid crystal layer 80 is substantially parallel to the traveling direction of the light which travels from the display panel PNL to the camera CA (i.e., the direction opposite to the third direction Z). For example, the control director is substantially parallel to the traveling direction of the light (i.e., a direction opposite to the third direction Z).

Since absorption of the light traveling from the display area DA to the camera CA does not occur in the liquid crystal layer 80 shown in FIG. 27A, the modulating element MO becomes the transmissive state. The camera CA can take in the external light beam transmitted through the display panel PNL in the transparent state and the modulating element MO in the transmissive state (i.e., the modulation area MA).

The alignment films 63 and 73 are desirably subjected to rubbing and a photo-alignment treatment, similarly to the present embodiment. This is because the alignment direction of the liquid crystalline molecule 82 can easily be controlled. Unlike the present embodiment, however, the alignment films 63 and 73 which are vertical alignment films may not be subjected to rubbing and a photo-alignment treatment. When a potential difference between the first control electrode EL1 and the second control electrode EL2 is 0V, the alignment film 63 and the alignment film 73 can urge the alignment restriction force to act on the liquid crystalline molecule 82 such that the control director is parallel to the direction (third direction Z) in which the alignment film 63 faces the alignment film 73.

As shown in FIG. 27B, the liquid crystal layer 80 in the light-shielding state is considered to be in a state in which a voltage (for example, a voltage exceeding 8V) is applied to the liquid crystal layer 80. In planar view, the long axis of the liquid crystalline polymer 81 remains tilted from the third direction Z. The electric field which occurs between the first control electrode EL1 and the second control electrode EL2 acts on the liquid crystalline molecule 82, and the long axis of the liquid crystalline molecule 82 thereby becomes parallel to the second direction Y. Since the dichroic dye molecule 83 is aligned in accordance with the liquid crystalline molecule 82, the long axis of the dichroic dye molecule 83 becomes parallel to the second direction Y.

When the modulating element MO is switched to the light-shielding state, a director (control director) of the liquid crystal layer 80 intersects the traveling direction of the light which travels from the display panel PNL to the camera CA (i.e., a direction opposite to the third direction Z). The traveling direction of the light intersects the long axis of the dichroic dye molecule 83. For example, the traveling direction of the light is orthogonal to the long axis of the dichroic dye molecule 83. Since the light traveling from the display area DA to the camera CA can be absorbed into the dichroic dye molecule 83, the modulating element MO becomes the light-shielding state.

The same advantages as those of the above-described third embodiment can also be obtained from the fifth embodiment configured as described above. The modulating element MO which can be switched to the transmissive state or the light-shielding state can be obtained by using the reverse mode polymer dispersed liquid crystal containing dye as the liquid crystal layer 80 and constituting the alignment films 63 and 73 with the vertical alignment films. The electronic device EA of the fifth embodiment may comprise the polarizing element POL described with reference to the fourth embodiment as needed.

Sixth Embodiment

Figure 28A:
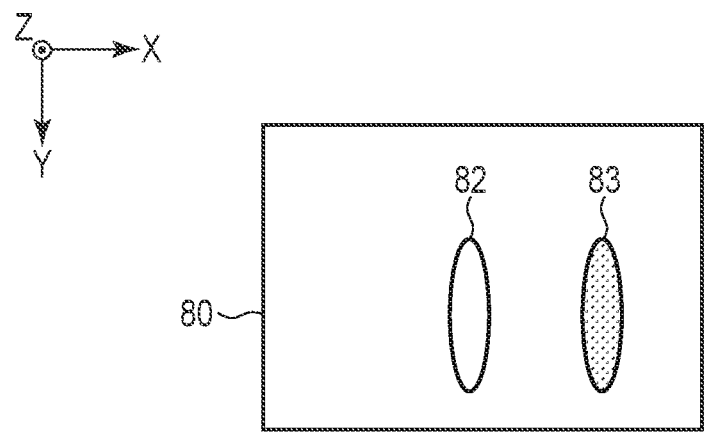
FIG. 28A is a diagram schematically showing a control liquid crystal layer in a state in which a modulating element of the electronic device according to a sixth embodiment is switched to a light-shielding state.
Figure 28B:
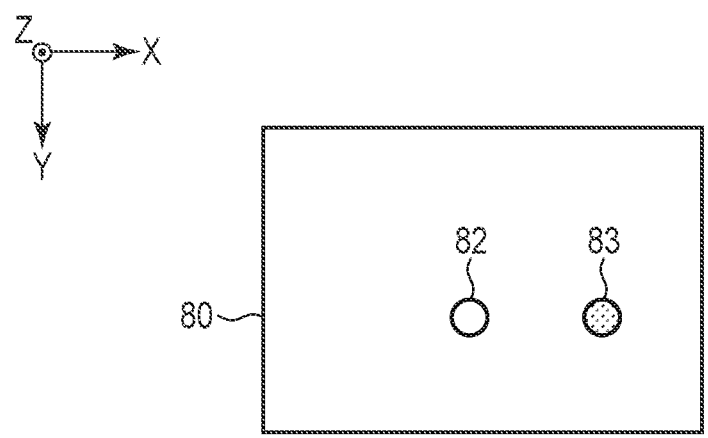
FIG. 28B is a diagram schematically showing a control liquid crystal layer in a state in which the modulating element of the electronic device according to the sixth embodiment is switched to a transmissive state.

Next, a sixth embodiment will be described. An electronic device EA is configured similarly to the electronic device EA of the above third embodiment except for a configuration to be described in the sixth embodiment. FIG. 28A is a diagram schematically showing the liquid crystal layer 80 in a state in which the modulating element MO of the electronic device EA according to the sixth embodiment is switched to a light-shielding state. FIG. 28B is a diagram schematically showing the liquid crystal layer 80 in a state in which the modulating element MO of the electronic device EA according to the sixth embodiment is switched to a transmissive state.

As shown in FIG. 28A, the liquid crystal layer 80 in the light-shielding state is considered to be in a state in which no voltage is applied to the liquid crystal layer 80 (0V). Each of the alignment film 63 and the alignment film 73 is a horizontal alignment film. Each of the alignment film 63 and the alignment film 73 is subjected to rubbing in a direction parallel to the second direction Y. The liquid crystalline molecule 82 is a positive liquid crystalline molecule having positive dielectric anisotropy. The liquid crystal layer 80 contains the liquid crystalline molecule 82 and the dichroic dye molecule 83 and uses guest-host liquid crystal. The control unit CON can switch the modulating element MO (liquid crystal layer 80) to a transmissive state or a light-shielding state.

In planar view, a long axis of the liquid crystalline molecule 82 and a long axis of the dichroic dye molecule 83 are parallel to the second direction Y. When the modulating element MO is switched to the light-shielding state, a control director which is a director of the liquid crystal layer 80 intersects the traveling direction of the light which travels from the display panel PNL to the camera CA (i.e., a direction opposite to the third direction Z). For example, the control director is orthogonal to the traveling direction of the light (i.e., a direction opposite to the third direction Z). When a potential difference between the first control electrode EL1 and the second control electrode EL2 is 0V, the alignment film 63 and the alignment film 73 urge the alignment restriction force to act on the liquid crystalline molecule 82 such that the control director is perpendicular to the direction (third direction Z) in which the alignment film 63 faces the alignment film 73. Since the light traveling from the display area DA to the camera CA can be absorbed into the dichroic dye molecule 83, the modulating element MO becomes the light-shielding state.

As shown in FIG. 28B, the liquid crystal layer 80 in the transmissive state is considered to be in a state in which a voltage (for example, a voltage of 5V) is applied to the liquid crystal layer 80. The electric field which occurs between the first control electrode EL1 and the second control electrode EL2 acts on the liquid crystalline molecule 82, and the long axis of the liquid crystalline molecule 82 thereby becomes parallel to the third direction Z in planar view. Since the dichroic dye molecule 83 is aligned in accordance with the liquid crystalline molecule 82, the long axis of the dichroic dye molecule 83 becomes parallel to the third direction Z.

When the modulating element MO is switched to the transmissive state, the director (control director) of the liquid crystal layer 80 is parallel to the traveling direction of the light which travels from the display panel PNL to the camera CA (i.e., the direction opposite to the third direction Z). The traveling direction of the light is parallel to the long axis of the dichroic dye molecule 83. Since absorption of the light traveling from the display area DA to the camera CA does not occur in the liquid crystal layer 80 shown in FIG. 28B, the modulating element MO becomes the transmissive state. The camera CA can take in the external light beam transmitted through the display panel PNL in the transparent state and the modulating element MO in the transmissive state (i.e., the modulation area MA).

The same advantages as those of the above-described third embodiment can also be obtained from the sixth embodiment configured as described above. The modulating element MO which is switched to the transmissive state or the light-shielding state can be obtained by using the guest-host liquid crystal as the liquid crystal layer 80. The electronic device EA of the sixth embodiment may comprise the polarizing element POL described with reference to the fourth embodiment as needed.

Unlike the present embodiment, the modulating element MO may be an electrochromic element which can be electrically switched to the transmissive state or the light-shielding state by using electrochromism as disclosed in JP 2021-12283 A1. In this case, the electronic device EA may comprise the polarizing element POL as needed.

Seventh Embodiment

Figure 29:
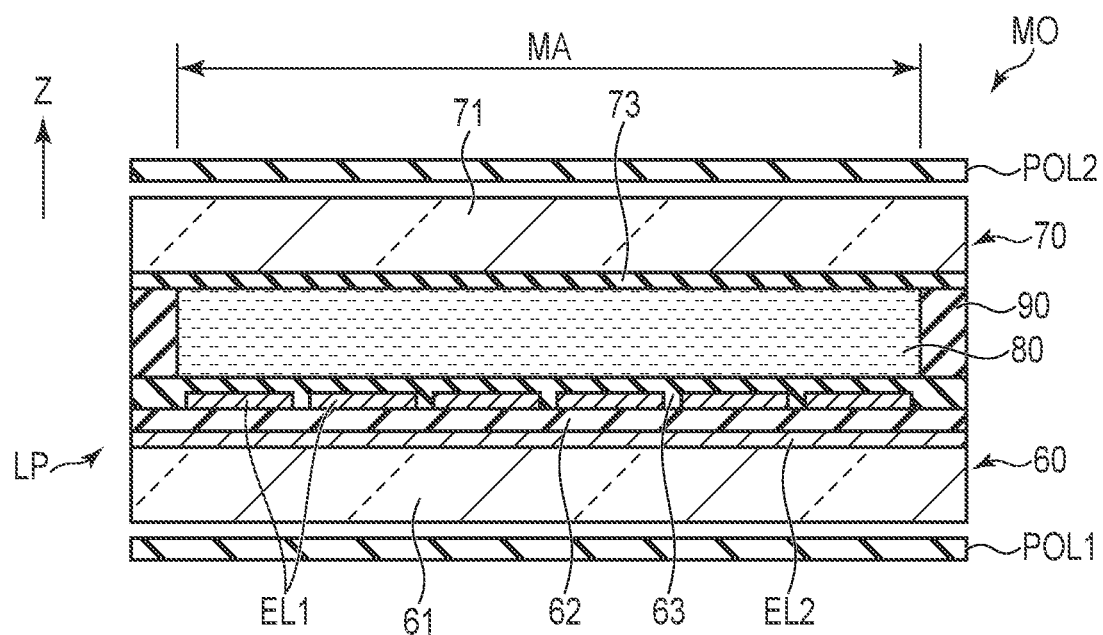
FIG. 29 is a cross-sectional view showing a modulating element of an electronic device according to a seventh embodiment.

Next, a seventh embodiment will be described. An electronic device EA is configured similarly to the electronic device EA of the above first embodiment except for a configuration to be described in the seventh embodiment. FIG. 29 is a cross-sectional view showing a modulating element MO of an electronic device EA according to the seventh embodiment. The modulating element MO of the present embodiment comprises not only a liquid crystal control panel, but also a polarizer.

As shown in FIG. 29, the modulating element MO comprises a first polarizing element POL1, a second polarizing element POL2, a first substrate (first control substrate) 60, a second substrate (second control substrate) 70, a second control electrode EL2, a liquid crystal layer (control liquid crystal layer) 80, and the like.

The first polarizing element POL1 is located on the camera CA side. The second polarizing element POL2 is opposed to the first polarizing element POL1 with a gap interposed therebetween and is located on a display panel PNL side.

The first substrate 60 is located between the first polarizing element POL1 and the second polarizing element POL2. The first substrate 60 comprises a transparent substrate 61, a plurality of first control electrodes EL1, an alignment film (first control alignment film) 63, and the like. In the present embodiment, the first substrate 60 includes a plurality of electrically independent first control electrodes EL1, but may include a single first control electrode EL1.

The second substrate 70 is located between the first substrate 60 and the second polarizing element POL2. The second substrate 70 comprises a transparent substrate 71, an alignment film (second control alignment film) 73, and the like.

The second control electrode EL2 is provided on the first substrate 60 or the second substrate 70. In the present embodiment, the second control electrode EL2 is provided on the first substrate 60 together with an insulating layer 62. The second control electrode EL2 is provided above a transparent substrate 61 and is covered with the insulating layer 62. The first control electrode EL1 is provided above the insulating layer 62 and is covered with an alignment film 63. The first control electrode EL1 and the second control electrode EL2 are formed of, for example, a transparent conductive material such as ITO or IZO, and are located in a modulation area MA.

Each of the alignment film 63 and the alignment film 73 is in contact with the liquid crystal layer 80.

The liquid crystal layer 80 is located in at least the modulation area MA. The liquid crystal layer 80 is held between the first substrate 60 and the second substrate 70.

The first substrate 60 and the second substrate 70 are bonded by a sealing material 90. The liquid crystal layer 80 is formed in a space surrounded by the first substrate 60, the second substrate 70, and the sealing material 90.

The first substrate 60, the second substrate 70, the second control electrode EL2, the liquid crystal layer 80, and the like described above constitute a liquid crystal control panel LP. For example, the first polarizing element POL1 may be bonded to the first substrate 60 (transparent substrate 61) by an adhesive (not shown). Similarly, the second polarizing element POL2 may be bonded to the second substrate 70 (transparent substrate 71) by an adhesive (not shown). The liquid crystal control panel LP is used together with the first polarizing element POL1 and the second polarizing element POL2. A liquid crystal panel of a lateral electric field disclosed in JP 2016-48276 A1 can be used as the liquid crystal control panel LP. A fast lateral electric field mode which is different from a general fringe field switching (FFS) mode and has a high response speed can be thereby implemented.

FIG. 30 is an exploded perspective view showing a part of the electronic device EA according to the seventh embodiment, illustrating a display panel PNL, a first polarizing element POL1, a second polarizing element POL2, an alignment film 63, an alignment film 73, the liquid crystal layer 80, and a camera CA.

As shown in FIG. 30, the liquid crystal layer 80 contains a liquid crystalline molecule 82. The second polarizing element POL2 is located between the display panel PNL and the alignment film 73 (second substrate 70). The first polarizing element POL1 has an easy transmission axis AXa1 and an absorption axis AXb1 which are orthogonal to each other. The second polarizing element POL2 has an easy transmission axis AXa2 and an absorption axis AXb2. In the present embodiment, an absorption axis AXb1 of the first polarizing element POL1 and an absorption axis AXb2 of the second polarizing element POL2 are orthogonal to each other.

In addition, in the present embodiment, the absorption axis AXb2 of the second polarizing element POL2 is parallel to a director (display director) of each liquid crystal area 3 to which a transparent voltage (second transparent voltage VA2) is applied, in planar view. Thus, the second polarizing element POL2 can supply an only S-polarized light component of the external light beam transmitted through the display panel PNL to the modulating element MO (liquid crystal layer 80) and can make the camera CA take in the component.

The same advantages as those of the above-described third embodiment can also be obtained from the seventh embodiment configured as described above. The modulating element MO which is switched to the transmissive state or the light-shielding state can be obtained by using not only the liquid crystal control panel LP, but also the polarizing elements (polarizers) POL1 and POL2.

The liquid crystal control panel LP is not limited to the liquid crystal panel of the seventh embodiment, but a general FFS mode liquid crystal panel, a vertical alignment (VA) mode liquid crystal panel, a twisted nematic (TN) mode liquid crystal panel, and the like may be used as the liquid crystal control panel.

In addition, in planar view, the absorption axis AXb2 of the second polarizing element POL2 may be orthogonal to the display director of each liquid crystal area 3 to which the transparent voltage is applied, and the absorption axis AXb1 of the first polarizing element POL1 may be parallel to the display director.

Alternatively, the absorption axis AXb1 of the first polarizing element POL1 and the absorption axis AXb2 of the second polarizing element POL2 may be parallel to each other.

Eighth Embodiment

Figure 31:
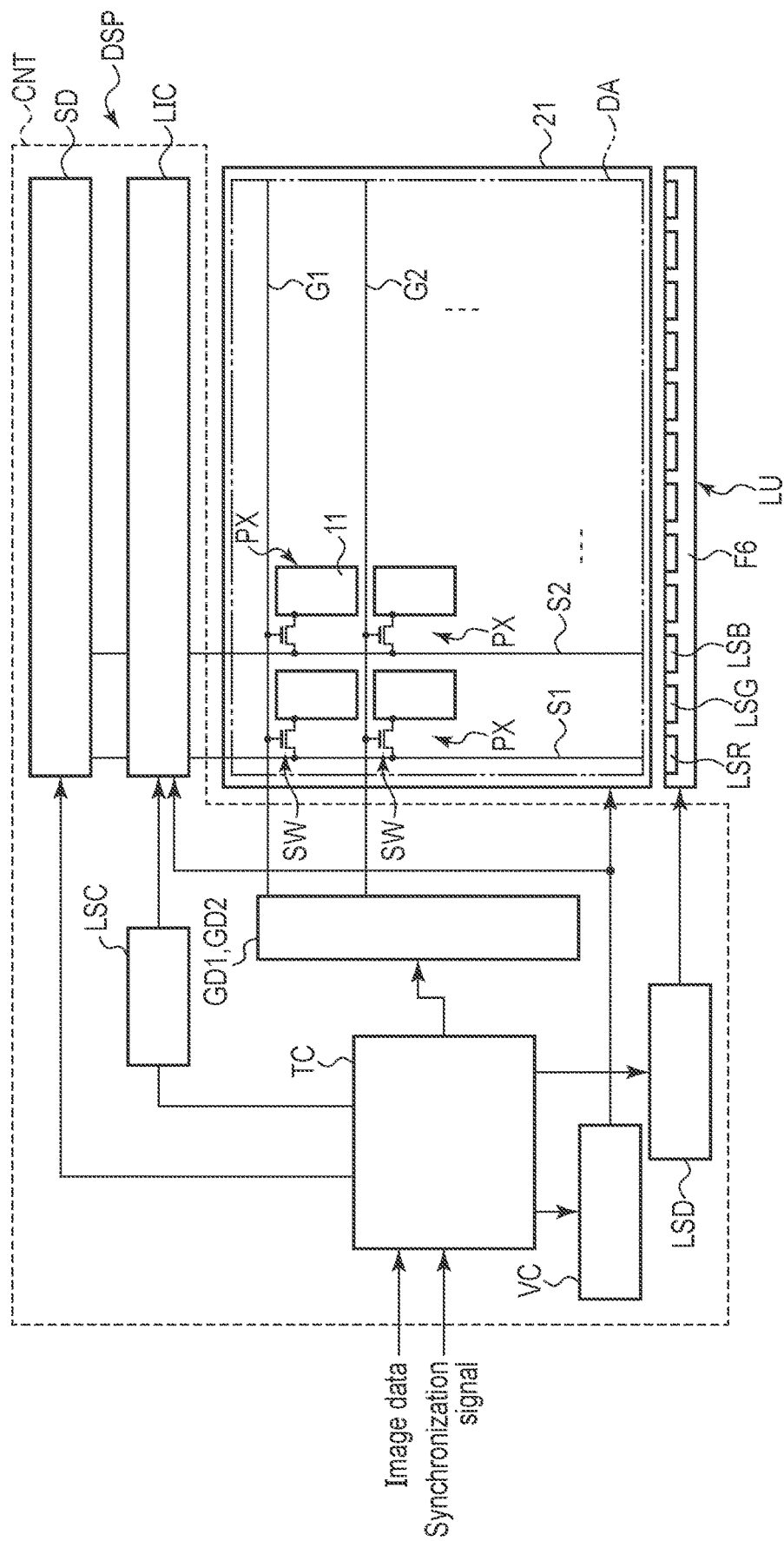
FIG. 31 is a diagram showing main components of a display device of an electronic device according to an eighth embodiment.

Next, an eighth embodiment will be described. An electronic device EA is configured similarly to the electronic device EA of the above first embodiment except for a configuration to be described in the eighth embodiment. FIG. 31 is a diagram showing main components of a display device DSP of an electronic device EA according to the eighth embodiment.

As shown in FIG. 31, a configuration of the display device DSP is different from that shown in FIG. 4 in that a controller CNT comprises a level conversion circuit (level shift circuit) LSC and a Vcom pull-in circuit LIC.

A common voltage (Vcom) supplied from a Vcom circuit VC is supplied to a common electrode 21 and also to the Vcom pull-in circuit LIC. The Vcom pull-in circuit LIC is intervened between a source driver SD and each of source lines S. The Vcom pull-in circuit LIC supplies a video signal output from the source driver SD to each of the source lines S. In addition, the Vcom pull-in circuit LIC can also supply a common voltage from the Vcom circuit VC to each of the source lines S.

Figure 32:
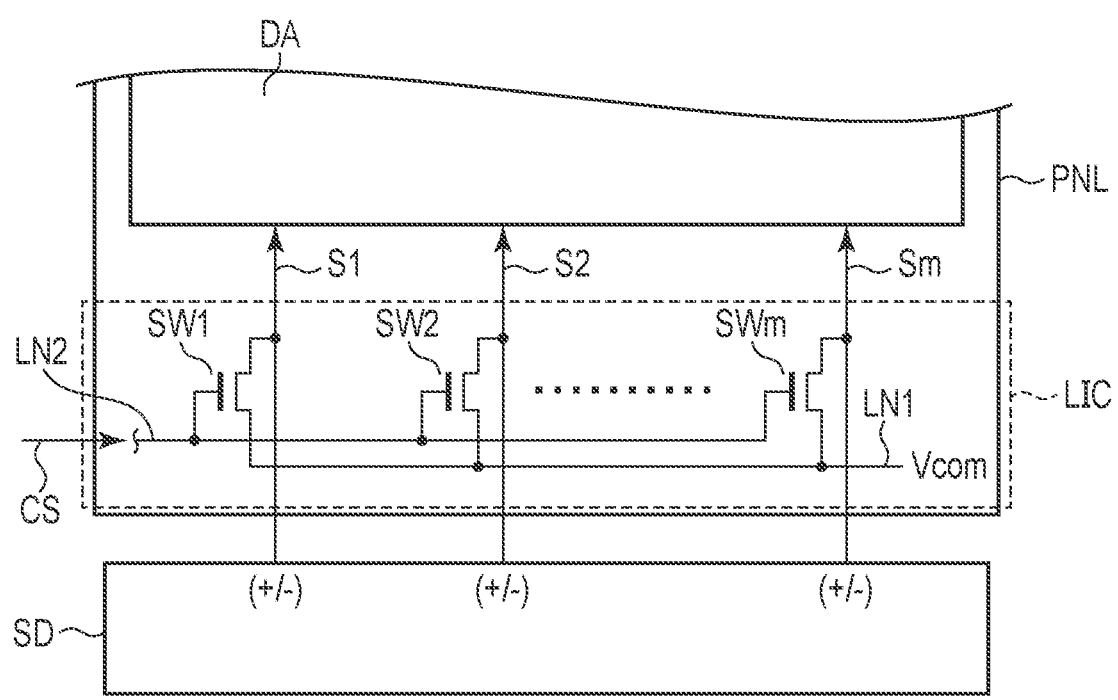
FIG. 32 is a diagram showing a configuration example of a Vcom pull-in circuit shown in FIG. 31.

FIG. 32 is a diagram showing a configuration example of the Vcom pull-in circuit LIC shown in FIG. 31. As shown in FIG. 32, the Vcom pull-in circuit LIC comprises switching elements SW1 to SWm. The switching elements SW1 to SWm are arranged on, for example, a first substrate SUB1 of a display panel PNL. The switching elements SW1 to SWm have input terminals (sources) connected to a line LN1, output terminals (drains) connected to the source lines S1 to Sm, respectively, and control terminals (gates) connected to a line LN2.

The Vcom circuit VC shown in FIG. 31 supplies a common voltage Vcom to the line LN1. Incidentally, this operation can be applied to, for example, the driving in a reset period Pr. In addition, a timing controller TC outputs a control signal CS to a level conversion circuit LSC when executing transparent drive. The level conversion circuit LSC converts this control signal CS into a voltage of a predetermined level and supplies the voltage to the line LN2. When the control signal CS is supplied to the line LN2, the line LN1 and each of the source lines S1 to Sm become conductive, and the common voltage Vcom of the line LN1 is supplied to each of the source lines S1 to Sm.

Thus, when the gate signal is supplied to each of gate lines G1 to Gn in a state in which the common voltage Vcom is supplied to each of the source lines S1 to Sm, the common voltage Vcom of each of the source lines S1 to Sm is supplied to each of pixel electrodes 11. In other words, a potential difference between each of the pixel electrodes 11 and the common electrode 21 becomes 0V (second transparent voltage VA2).

The same advantages as those of the above-described first embodiment can also be obtained from the eighth embodiment configured as described above. According to the configuration of the eighth embodiment, a circuit for supplying the voltage (for example, the common voltage Vcom) for transparent drive to the source driver SD and the like do not need to be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. The embodiments and the modified examples can also be combined as needed.

For example, the display device DSP may be configured without the light source unit LU. In this case, the display device DSP may comprise a liquid crystal display panel and a polarizer using a liquid crystal other than the polymer dispersed liquid crystal, instead of the display panel PNL using the polymer dispersed liquid crystal. Alternatively, the display device DSP may comprise a transparent organic EL display panel, instead of the display panel PNL using the polymer dispersed liquid crystal.

Pieces of sub-frame data stored in the line memories 52R, 52G, and 52B are examples of first sub-frame data representing an image of a first color, second sub-frame data representing an image of a second color, and third sub-frame data representing an image of a third color.

The first color, the second color, and the third color are not limited to red, blue, and green colors. In addition, the light source unit LU may comprise light emitting elements LS of two or less colors or may comprise light emitting elements LS of four or more colors. Alternatively, the light source unit LU may comprise a light emitting element LS of white color. The number of line memories, the number of pieces of the sub-frame data, and the number of sub-frame periods may be increased or reduced in accordance with the number of types (number of colors) of the light emitting elements LS.

A normal mode polymer dispersed liquid crystal may be used as the liquid crystal layer 30. The liquid crystal layer 30 maintains parallelism of the incident light when the applied voltage is high or scatters the incident light when the applied voltage is low.

What is claimed is:

1. An electronic device comprising:
   a display panel including a display area on which an image is displayed and which transmits external light;
   a light source unit located outside an area opposed to the display area of the display panel;
   a camera opposed to the display area of the display panel;
   a modulating element located between the display area of the display panel and the camera, and switched to a transmissive state which transmits light traveling from the display area to the camera and a light-shielding state in which the light traveling from the display area to the camera is blocked; and
   a control unit controlling drive of the display panel, the light source unit, and the modulating element,
   the control unit
      permitting light emission executed by the light source unit, making light emitted to the display area, displaying the image in the display area, and switching the modulating element to the light-shielding state, in a light emission period, and
      prohibiting the light emission executed by the light source unit, making the display area transparent, switching the modulating element to the transmissive state, and making the camera take in the external light transmitted through the display area and the modulating element, in a capturing period independent of the light emission period.

2. The electronic device of claim 1, wherein
the display panel includes a plurality of pixel electrodes, a common electrode, and a display function layer each located in the display area, and
the control unit
   applies a voltage between the plurality of pixel electrodes and the common electrode and prohibiting the light emission executed by the light source unit, in a write period, and
   makes light emitted to the display function layer, in the light emission period independent of the write period and subsequent to the write period.

3. The electronic device of claim 2, wherein
the display function layer includes a plurality of display function areas,
a scattering voltage and a transparent voltage are selectively applied to each of the display function areas by applying a voltage between a corresponding pixel electrode of the plurality of pixel electrodes and the common electrode,
the control unit
   selectively applies the scattering voltage and the transparent voltage to the plurality of display function areas, in the write period,
   maintains a state where the scattering voltage and the transparent voltage are selectively applied to the plurality of display function areas, and scatters the light emitted from the light source unit in a plurality of display function areas to which the scattering voltage is applied, of the plurality of display function areas, in the light emission period, and
   applies the transparent voltage to the plurality of display function areas and makes external light transmitted in the plurality of display function areas, in the capturing period, and
parallelism of external light transmitted through each of the display function areas when the transparent voltage is applied is higher than the parallelism of the external light transmitted through each of the display function areas when the scattering voltage is applied.

4. The electronic device of claim 3, wherein
one frame period includes the write period, the light emission period, and a reset period which is independent of the write period and the light emission period and which precedes the write period or follows the light emission period,
the transparent voltage includes a first transparent voltage and a second transparent voltage,
the control unit
   selectively applies the scattering voltage and the first transparent voltage to the plurality of display function areas, in the write period,
   maintains a state where the scattering voltage and the first transparent voltage are selectively applied to the plurality of display function areas, and scatters the light emitted from the light source unit in a plurality of display function areas to which the scattering voltage is applied, of the plurality of display function areas, in the light emission period, and applies the second transparent voltage to the plurality of display function areas, in the reset period, parallelism of external light transmitted through each of the display function areas when the second transparent voltage is applied is higher than the parallelism of the external light transmitted through each of the display function areas when the first transparent voltage is applied, and the control unit sets the capturing period within the write period and the reset period.

5. The electronic device of claim 4, wherein the light source unit includes a first light emitting element which emits light of a first color to the display function layer, a second light emitting element which emits light of a second color to the display function layer, and a third light emitting element which emits light of a third color to the display function layer, the one frame period includes a first sub-frame period, a second sub-frame period, and a third sub-frame period, which are independent of each other, each of the first sub-frame period, the second sub-frame period, and the third sub-frame period includes the write period and the light emission period, at least one of the first sub-frame period, the second sub-frame period, and the third sub-frame period further includes the reset period, the control unit permits emission of light of the first color executed by the first light emitting element, prohibits emission of light of the second color executed by the second light emitting element, and prohibits emission of light of the third color executed by the third light emitting element, in the light emission period of the first sub-frame period, and scatters the light of the first color in a plurality of display function areas to which the scattering voltage is applied in the write period of the first sub-frame period, permits emission of light of the second color executed by the second light emitting element, prohibits emission of light of the first color executed by the first light emitting element, and prohibits emission of light of the third color executed by the third light emitting element, in the light emission period of the second sub-frame period, and scatters the light of the second color in the plurality of display function areas to which the scattering voltage is applied in the write period of the second sub-frame period, and permits emission of light of the third color executed by the third light emitting element, prohibits emission of light of the first color executed by the first light emitting element, and prohibits emission of light of the second color executed by the second light emitting element, in the light emission period of the third sub-frame period, and scatters the light of the third color in the plurality of display function areas to which the scattering voltage is applied in the write period of the third sub-frame period, and the control unit sets the capturing period within the plurality of write periods and the reset period of the one frame period.

6. The electronic device of claim 3, wherein the display panel further includes:

a first display substrate including the plurality of pixel electrodes and a first display alignment film in contact with the display function layer; and a second display substrate including the common electrode and a second display alignment film in contact with the display function layer, each of the first display alignment film and the second display alignment film is a horizontal alignment film, and the display function layer is a display liquid crystal layer using reverse mode polymer dispersed liquid crystal containing a liquid crystalline polymer and a liquid crystalline molecule, and is held between the first display substrate and the second display substrate.

7. The electronic device of claim 6, wherein a direction in which the light source unit emits light to the display area is orthogonal to a display director that is a director of each of the display function areas to which the transparent voltage is applied, in planar view.

8. The electronic device of claim 6, wherein the modulating element is a liquid crystal control panel including a control liquid crystal layer using guest-host liquid crystal containing a liquid crystalline molecule and a dichroic dye molecule.

9. The electronic device of claim 8, wherein when the modulating element is switched to the light-shielding state, a control director which is a director of the control liquid crystal layer intersects a traveling direction of the light traveling from the display panel to the camera CA, and when the modulating element is switched to the transmissive state, the control director is parallel to the traveling direction of the light traveling from the display panel to the camera.

10. The electronic device of claim 9, further comprising:

a polarizing element located between the display area of the display panel and the modulating element or between the modulating element and the camera, and having an absorption axis and an easy transmission axis orthogonal to each other, wherein the absorption axis of the polarizing element is parallel to a display director that is a director of each of the display function areas to which the transparent voltage is applied, in planar view.

11. The electronic device of claim 6, wherein the modulating element comprises:

a first control substrate including a first control electrode and a first control alignment film;

a second control substrate including a second control electrode and a second control alignment film; and a control liquid crystal layer containing a liquid crystalline polymer, a liquid crystalline molecule, and a dichroic dye molecule, using polymer dispersed liquid crystal or reverse mode polymer dispersed liquid crystal, and held between the first control substrate and the second control substrate, and each of the first control alignment film and the second control alignment film is in contact with the control liquid crystal layer.

12. The electronic device of claim 11, wherein each of the first control alignment film and the second control alignment film is a vertical alignment film or a horizontal alignment film, when each of the first control alignment film and the second control alignment film is the vertical alignment film and a potential difference between the first control electrode and the second control electrode is 0V, the first control alignment film and the second control alignment film make an alignment restriction force act on the liquid crystalline molecule such that a control director that is a director of the control liquid crystal layer is parallel to a direction in which the first control alignment film faces the second control alignment film or the first control alignment film and the second control alignment film make the alignment restriction force act on the liquid crystalline molecule such that the control director is tilted from the direction in which the first control alignment film faces the second control alignment film, and when each of the first control alignment film and the second control alignment film is the horizontal alignment film and a potential difference between the first control electrode and the second control electrode is 0V, the first control alignment film and the second control alignment film make the alignment restriction force act on the liquid crystalline molecule such that the control director is orthogonal to the direction in which the first control alignment film faces the second control alignment film.

13. The electronic device of claim 11, wherein when the modulating element is switched to the light-shielding state, a control director which is a director of the control liquid crystal layer intersects a traveling direction of the light traveling from the display panel to the camera CA, and when the modulating element is switched to the transmissive state, the control director is parallel to the traveling direction of the light traveling from the display panel to the camera.

14. The electronic device of claim 13, further comprising:

a polarizing element located between the display area of the display panel and the modulating element or between the modulating element and the camera, and having an absorption axis and an easy transmission axis orthogonal to each other, wherein the absorption axis of the polarizing element is parallel to a display director that is a director of each of the display function areas to which the transparent voltage is applied, in planar view.

15. The electronic device of claim 6, wherein the modulating element comprises:

a first polarizing element having an absorption axis and an easy transmission axis orthogonal to each other;

a second polarizing element opposed to the first polarizing element with a gap interposed therebetween and having an absorption axis and an easy transmission axis orthogonal to each other;

a first control substrate located between the first polarizing element and the second polarizing element and including a first control electrode and a first control alignment film;

a second control substrate located between the first control substrate and the second polarizing element and including a second control alignment film;

a second control electrode provided on the first control substrate or the second control substrate; and a control liquid crystal layer containing a liquid crystalline molecule and held between the first control substrate and the second control substrate, each of the first control alignment film and the second control alignment film is in contact with the control liquid crystal layer, and the absorption axis of the first polarizing element and the absorption axis of the second polarizing element are orthogonal or parallel to each other.

16. The electronic device of claim 15, wherein the second polarizing element is located between the display panel and the second control substrate, and the absorption axis of the second polarizing element is parallel to a display director that is a director of each of the display function areas to which the transparent voltage is applied, in planar view.

* * * * *